United States Patent
Toon

(10) Patent No.: US 10,882,721 B2
(45) Date of Patent: Jan. 5, 2021

(54) DOUBLE LOCKING HOOK

(71) Applicant: John Toon, Dyce (GB)

(72) Inventor: John Toon, Dyce (GB)

(*) Notice: Subject to any disclaimer, the term of this patent is extended or adjusted under 35 U.S.C. 154(b) by 0 days.

(21) Appl. No.: 16/552,100

(22) Filed: Aug. 27, 2019

(65) Prior Publication Data

US 2020/0062553 A1 Feb. 27, 2020

Related U.S. Application Data

(60) Provisional application No. 62/723,145, filed on Aug. 27, 2018.

(51) Int. Cl.
*B66C 1/36* (2006.01)
*F16B 45/02* (2006.01)

(52) U.S. Cl.
CPC ............. *B66C 1/36* (2013.01); *F16B 45/02* (2013.01)

(58) Field of Classification Search
CPC .................................. B66C 1/36; F16B 45/02
USPC ..................... 294/82.19, 82.21, 82.23, 82.34
See application file for complete search history.

(56) References Cited

U.S. PATENT DOCUMENTS

| | | | | |
|---|---|---|---|---|
| 2,927,358 A * | 3/1960 | Ratcliff | ............. | B66C 1/36 294/82.21 |
| 4,039,220 A * | 8/1977 | Stoops | ............. | B66C 1/36 294/82.2 |
| 4,122,585 A * | 10/1978 | Sharp | ............. | B66C 1/36 24/599.5 |
| 4,293,156 A * | 10/1981 | Chapalain | ............. | B66C 1/36 24/600.2 |
| 4,539,732 A | 9/1985 | Wolner | | |
| 4,546,523 A * | 10/1985 | Bailey, Jr. | ............. | F16B 45/02 24/599.4 |
| 4,977,647 A * | 12/1990 | Casebolt | ............. | B66C 1/36 24/599.5 |
| 5,896,630 A | 4/1999 | Smith et al. | | |
| 8,240,727 B2 * | 8/2012 | Toon | ............. | B66C 1/36 294/82.21 |
| 2015/0130199 A1 * | 5/2015 | Pantsar | ............. | B66C 1/36 294/82.2 |
| 2016/0230804 A1 | 8/2016 | Huang | | |
| 2016/0376129 A1 * | 12/2016 | Hendrix | ............. | F16B 45/02 294/82.2 |

OTHER PUBLICATIONS

International Search Report, International Application No. PCT/GB2019/052387, ISA (dated Nov. 21, 2019).

* cited by examiner

*Primary Examiner* — Dean J Kramer
(74) *Attorney, Agent, or Firm* — Wright IP & International Law; Eric G. Wright

(57) ABSTRACT

A lockable safety hook such as used for lifting loads and the like wherein the locking mechanism features a double locking function by way of a lock securing device arranged to prevent movement or unintentional activation of the locking mechanism by "locking the lock".

14 Claims, 21 Drawing Sheets

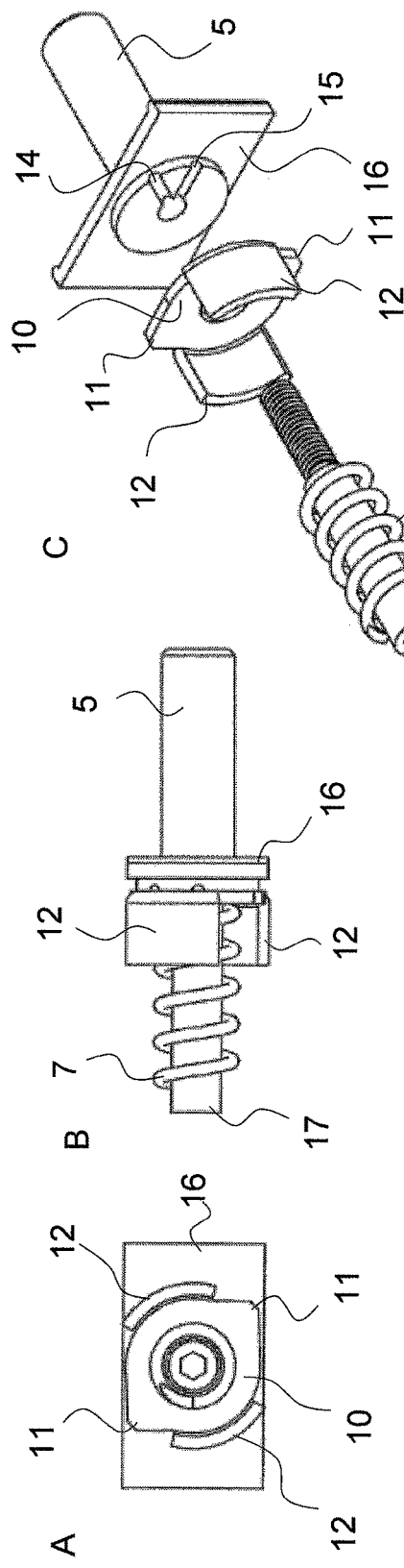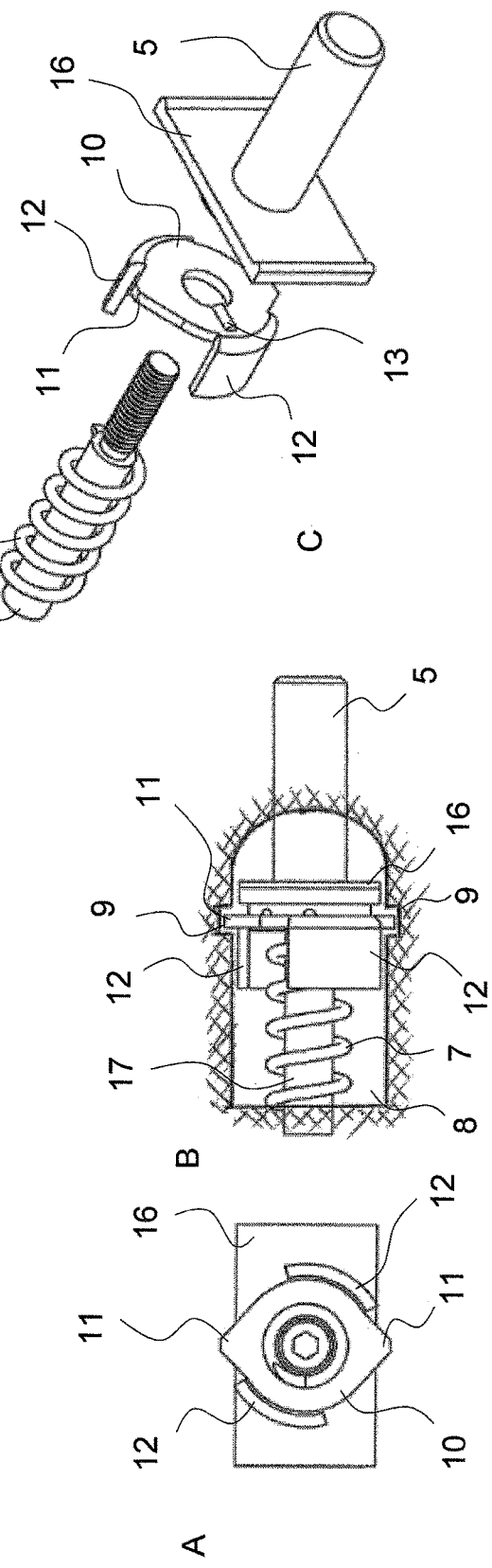

DOUBLE LOCKING HOOK

CROSS-REFERENCE TO RELATED APPLICATIONS

This application is a non-provisional US patent application of U.S. provisional application 62/723,145 filed Aug. 27, 2018 and titled "Improved Hook" in the ADS, Electronic Acknowledgement Receipt and specification, and referred to as "Hook" in the USPTO Filing Receipt dated Sep. 4, 2018, for 62/723,145. This non-provisional application claims benefit of the provisional application 62/723,145 filing date of Aug. 27, 2018.

INCORPORATION BY REFERENCE

This non-provisional US patent application incorporates by reference in its entirety U.S. provisional application 62/723,145 filed Aug. 27, 2018 titled "Improved Hook" in the ADS, Electronic Acknowledgement Receipt and specification, and referred to as "Hook" in the USPTO Filing Receipt dated Sep. 4, 2018, for 62/723,145.

FIELD OF THE INVENTION

Technical Field

The present disclosure relates to the general field of hooks for lifting a load, such as those used with a crane or similar. In particular, the present disclosure relates to hook locking mechanisms and improvements thereof.

Background

General lifting hooks which can be closed and locked during a lifting operation are typically referred to as "Safety" hooks. These common lifting hooks are defined as having a main hook body, a locking arm, a load bearing pin to couple these parts together allowing the arm portion to pivot relative to the main hook portion to open and close the hook, and a locking mechanism or device which, in some form or another, serves to prevent the relative movement of the locking arm and hook body thus holding and locking the hook closed under normal operational conditions.

Safety hooks when in this locked position should contain the load and thereby prevent the load being lost from the hook. However, it is well documented throughout the industry that there have been many instances whereby a "safety" hook has unintentionally released or opened through the failure of the locking mechanism or locking device to retain the locking arm in the closed position. Unintentional lock activation is known to occur under certain operational circumstances such as when a loaded hook and its lock mechanism has been subjected to abnormal lateral and/or vertical forces, or through an intrinsic hazard whereby the risk of lock failure is heightened such as when said hook and it's locking mechanism show a degree of wear and tear which induces additional play or free movement within the locking mechanism reducing its integrity.

The failure of a hook locking mechanism to remain in the locked closed position is compounded in larger sized safety hooks where the main load bearing components have significantly higher proportions of mass in relationship to the lock mechanism components. Under abnormal force conditions this additional mass increases the kinetic energy transmitted into the lock components which can cause an unplanned activation/opening or outright failure of the locking mechanism.

Failure of the safety hook locking mechanism to remain in the locked position, or an unplanned lock activation can, and do, create hazardous situations with the potential to cause serious injury and/or property damage.

Examples of safety hooks include those described in the following: U.S. Pat. No. 1,554,303 to Smith, U.S. Pat. No. 1,956,786 to Bemis, U.S. Pat. No. 1,430,543 to Bulten-Kanthal, U.S. Pat. No. 3,940,173 to Ulbing, U.S. Pat. No. 4,309,052 to Drayton, and U.S. Pat. No. 4,293,156 to Chaplain.

Accordingly, there is a need for improved safety hooks that retain their load more reliably than those hooks known in the art.

The preceding discussion of the background is intended only to facilitate an understanding of the present disclosure. It is an object of at least one aspect the present disclosure to make safety hooks more secure, to overcome, or at least ameliorate one or more of the deficiencies of known hooks.

Other objects and advantages of the present disclosure will become apparent from the following description and drawings, wherein by way of illustration and examples, preferred embodiments are disclosed.

SUMMARY

The present disclosure provides hooks comprising a hook body and a hook arm and a safety mechanism that double locks the hook to prevent a load being carried by the hook being released from the hook accidentally or unintentionally. The safety mechanism may be a locking mechanism that locks the position of the hook arm and the hook body in a closed position.

According to a first aspect, there is provided a hook comprising a hook body, a hook arm, and a locking mechanism; the hook arm being pivotably coupled to the hook body such that the hook arm and hook body are pivotable relative to one another between an open configuration in which the hook arm and the hook body together define a discontinuous boundary, and a closed configuration in which the hook arm and the hook body define a substantially continuous boundary. The locking mechanism may be configured to lock the hook arm in at least the closed configuration. The hook may comprise a lock securing device being configured to move between an engaged configuration and a disengaged configuration; wherein the lock securing device prevents activation of the locking mechanism when the lock securing device is in the engaged configuration.

As a result, during use the hook of the present aspect is locked and then the lock itself is secured or locked so that, in effect, the hook is locked twice. Accordingly, the hook of the present aspect ensures that the hook arm does not open, even if the hook is subjected to abnormal lateral and/or vertical forces, or when the locking mechanism has been damaged or is worn. Accordingly, the hook of the present aspect is more secure than hooks known in the art and thereby increases user safety and load integrity.

The locking mechanism may comprise a locking element and a biasing element, and the hook arm may comprise a recess configured to receive the locking element of the locking mechanism, such that when the hook arm is in the closed configuration, the locking element of the locking mechanism is urged by the biasing element into the recess of the hook arm, thereby locking the hook arm in the closed configuration.

Typically, the biasing element retains the locking element in the recess of the hook arm.

The biasing element may be a spring, for example. The spring may be a coil spring or a leaf spring. However, it will be appreciated that the biasing element may be any element that is capable of urging the locking element against the hook arm.

The locking element may be a locking pin, a locking shaft, a locking pawl or similar.

For example, in one embodiment the locking element is a locking pin.

The locking mechanism may comprise an actuator that allows the user to actuate the locking mechanism. The actuator may allow the user to actuate the locking mechanism to release the hook arm from the closed configuration, and to thereby move into an open configuration. The actuator may allow the user to actuate the locking mechanism to secure the hook arm in the closed configuration.

It will be appreciated that the lock securing device of the present disclosure can be adapted to be used with any kind of hook locking mechanism and is not limited to those specific embodiments described herein.

The lock securing device may be connected to one or more of the components of the locking mechanism, and during use, the lock securing device may secure one or more component of the locking mechanism to the hook body. The lock securing device may be connected to the hook body and, during use, the lock securing device may secure one or more component of the locking mechanism to the hook body.

Accordingly, the hook body may comprise the lock securing device. Alternatively, the locking mechanism may comprise the lock securing device.

Typically, the direction of movement of the lock securing device as the lock securing device moves between the engaged configuration and the disengaged configuration, and vice versa, is in a different direction than that of the locking mechanism. Accordingly, the direction of movement of the locking mechanism when the locking mechanism is activated or actuated is in a different direction than the direction of movement of the lock securing device when the lock securing device is activated or actuated. For example, the direction of movement of the locking mechanism may be a linear translation of at least a component of the locking mechanism away from or towards the hook arm, and the direction of movement of the lock securing device may be a rotation about the locking mechanism in a direction perpendicular to that of the locking mechanism. For example, the lock securing device may rotate about the axis of the direction of movement of the locking mechanism.

The hook body may comprise a cavity, and the locking mechanism may be located within the cavity of the hook body.

The cavity may extend through the hook body such that the cavity is an aperture through the hook body. The cavity may be a recessed portion of the hook body such that the cavity does not extend through the hook body and is open on one side of the hook body and closed on the opposite side of the hook body. The cavity may be an internal cavity, and the internal cavity may have an aperture in the hook body to allow the locking mechanism to be accessed by a user.

The lock securing device may comprise at least one lock formation adapted to be received into at least one groove in the side or sides of the hook body defining the cavity.

Accordingly, when the lock securing device is engaged, the components of the locking mechanism are fixed in place. For example, in embodiments where the locking mechanism comprises a locking pin and biasing element, the presence of the at least one lock formation within the at least one groove prevents movement of the locking mechanism relative to the hook body, thereby preventing the locking pin from being retracted from the recess of the hook arm. As a result, the hook arm remains locked in the closed configuration, even if a force is applied against the locking mechanism that would otherwise release the hook arm.

The lock securing device may comprise at least two lock formations adapted to be received into at least two grooves in the sides of the hook body defining the cavity.

The lock securing device may comprise a locking pin, clip, sliding plate or rotating plate.

The lock securing device may comprise a biasing element, such that when the hook is in the closed configuration, the at least one lock formation is urged by the biasing element into the at least one groove, thereby automatically engaging the lock securing device and preventing operation of the lock mechanism and double locking the hook in a closed configuration.

The biasing element may be a spring, for example. The spring may be a torsion spring, or a leaf spring. However, it will be appreciated that the biasing element may be any element that is capable of urging the at least one lock formation into the at least one groove.

In embodiments where the lock securing device is required to be operated manually, the biasing element may comprise an overlock spring, such that the lock securing device may be selectively activated and retained, under the bias of the overlock spring, to either engage or disengage the lock securing device. For the avoidance of doubt, an overlock spring is configured to retain a switch, for example, in one of two positions such that it is locked in either position until manually changed. Accordingly, the hook may be suitable for manual operation by an underwater Remotely operated vehicle (ROV).

In embodiments where the lock securing device comprises a locking pin, the locking pin may be mounted on or within the hook body and may be moved from a disengaged position where the locking pin is retained within the hook body to an engaged position where the locking pin is engaged in a cooperating recess in the locking mechanism, thereby preventing movement of the locking mechanism relative to the hook body. Alternatively, the locking pin may be mounted on or within the locking mechanism and may be moved from a disengaged position where the locking pin is retained within the locking mechanism to an engaged position where the locking pin is engaged in a cooperating recess in the hook body, thereby preventing movement of the locking mechanism relative to the hook body.

In embodiments where the lock securing device comprises a clip, the clip may be mounted on the hook body and may be positioned such that an engaging formation on the clip may be moved to engage with a cooperating formation on the locking mechanism to thereby prevent movement of the locking mechanism relative to the hook body. Alternatively, the clip may be mounted on the locking mechanism and may be positioned such that an engaging formation on the clip may be moved to engage with a cooperating formation on the hook body to thereby prevent movement of the locking mechanism relative to the hook body.

In embodiments where the lock securing device comprises a sliding plate, the sliding plate may be mounted on the hook body and may be positioned such that the sliding plate may be moved to engage with a recess or cooperating formation on the locking mechanism to thereby prevent movement of the locking mechanism relative to the hook body. Alternatively, the sliding plate may be mounted on the locking mechanism and may be positioned such that an engaging formation on the sliding plate may be engaged with a cooperating formation on the hook body to thereby prevent movement of the locking mechanism relative to the hook body.

In embodiments where the locking mechanism comprises a locking pin and a biasing element, the lock securing device may be configured to be rotated about the locking pin of the locking mechanism between the engaged configuration and disengaged configuration.

The lock securing device may comprise a rotatable locking element. The rotatable locking element may comprise one or more lock formation. The rotatable locking element may comprise a central portion connected to the or each lock formation. Rotation of the rotatable locking element about the locking pin may move the lock securing device from the engaged configuration to the disengaged configuration. Rotation of the rotatable locking element about the locking pin may move the lock securing device from the disengaged configuration to the engaged configuration.

Accordingly, the rotatable locking element typically has an axis of rotation.

In embodiments where the rotatable locking element comprises two or more lock formations, the rotatable locking element may be shaped symmetrically about the axis of rotation of the rotatable locking element. The rotatable locking element may be planar and the two or more lock formations may lie within the plane of the rotatable locking element. The lock formations may be a continuation of the central portion of the rotatable locking element.

The lock securing device may comprise an actuator adapted to allow a user to move the lock securing device between the engaged configuration and the disengaged configuration. In embodiments where the lock securing device comprises a rotatable locking element, the actuator may assist or allow a user to rotate the rotatable locking element between the engaged configuration and the disengaged configuration.

The lock securing device may comprise a retaining formation configured to retain the lock securing device in the engaged configuration when the lock securing device is in the engaged configuration and/or to retain the lock securing device in the disengaged configuration. The lock securing device may comprise a plurality of retaining formations configured to retain the lock securing device in the engaged configuration when the lock securing device is in an engaged configuration and/or retain the lock securing device in the disengaged configuration to retain the lock securing device in the disengaged configuration.

The locking mechanism may comprise a retaining groove configured to receive the retaining formation of the lock securing device when the lock securing device is in the engaged formation.

The locking mechanism may comprise a retaining groove configured to receive the retaining formation of the lock securing device when the lock securing device is in the disengaged configuration.

The locking mechanism may comprise a first retaining groove configured to receive the retaining formation of the lock securing device when the lock securing device is in the engaged configuration. The locking mechanism may comprise a second retaining groove configured to receive the retaining formation of the lock securing device when the lock securing device is in the disengaged configuration.

Typically, the first retaining groove and the second retaining groove are located on a portion of the locking mechanism adjacent to the lock securing device such that the retaining formation of the lock securing device is received into the first or second retaining groove, depending on the configuration of the lock securing device. In embodiments where the lock securing device comprises a rotatable locking element, the first and second retaining grooves may be located such that as the rotatable locking element is rotated between the engaged configuration and the disengaged configuration the retaining formation is rotated between the first and second retaining grooves.

The hook body and the hook arm may define a first aperture when the hook arm is in the closed configuration. The first aperture may be adapted to receive a load that is to be handled by the hook. Accordingly, a load may be received by the hook when the hook arm is in the open configuration and the load may be retained on the hook when the hook arm is locked in the closed configuration.

The hook body may comprise a handle. The handle may be integral to the hook body. The handle and the hook body may define a second aperture that is adapted to receive the fingers of a user as the user grips the handle.

The actuator of the locking mechanism may be adapted to be operated by the thumb of a user whilst the user is gripping the handle of the hook body with the same hand.

The actuator of the lock securing device may be adapted to be operated by the thumb of a user whilst the user is gripping the handle of the hook body with the same hand.

The actuator of the locking mechanism and the actuator of the lock securing device may be located adjacent to one another, such that they are both adapted to be operated by the thumb of a user whilst the user is gripping the handle of the hook body with the same hand.

The or an actuator of the locking mechanism and/or lock securing device may be located such that they can be readily reached by the thumb of a user's hand holding the handle of the hook. Accordingly, the or an actuator of the locking mechanism and/or lock securing device may be actuated by the thumb of a user's hand holding the handle of the hook.

The actuator of the locking mechanism may be adapted to be operated by the hand of the user that is not holding the handle.

The actuator of the lock securing device may be adapted to be operated by the hand of the user that is not holding the handle.

The hook may be a crane hook.

The hook may be a larger sized hook. Accordingly, the hook may be adapted to carry a load of up to around 8 tonnes. The hook may be adapted to carry loads of up to around 15 tonnes. The hook may be adapted to carry a load of up to around 40 tonnes.

Larger sized hooks typically comprise main load bearing components having significantly higher proportions of mass in relationship to the lock mechanism components. As a result, if the hook receives abnormal forces, such as being struck or dropped, for example, the weak point of the hook is the locking mechanism, and so the locking mechanism is more likely to fail.

The hook may comprise a suspension element from which the hook may be suspended during use. The hook body may comprise the suspension element. The hook arm may comprise the suspension element. The suspension element may be configured to connect the hook to a crane or other lifting device via an intermediate connecting chain or wire. The suspension element may comprise an eyelet, swivel or shank to attach directly to a crane block. The eyelet may be configured to allow the hook to be attached to the connecting chain or wire for connecting to and suspending the hook from a crane.

BRIEF DESCRIPTION OF THE FIGURES

Embodiments of the present invention will now be described, by way of non-limiting example, with reference to the accompanying drawings.

FIG. 6—A) front on view of a lock securing device, B) a side on view of a locking mechanism, and C) an exploded view of a locking mechanism, where the locking mechanism and lock securing device are in the un-engaged position;

FIG. 7—A) front on view of a lock securing device, B) a side on view of a locking mechanism, and C) an exploded view of a locking mechanism, where the locking mechanism and lock securing device are in the engaged position;

DETAILED DESCRIPTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Example 1

Figure 8:
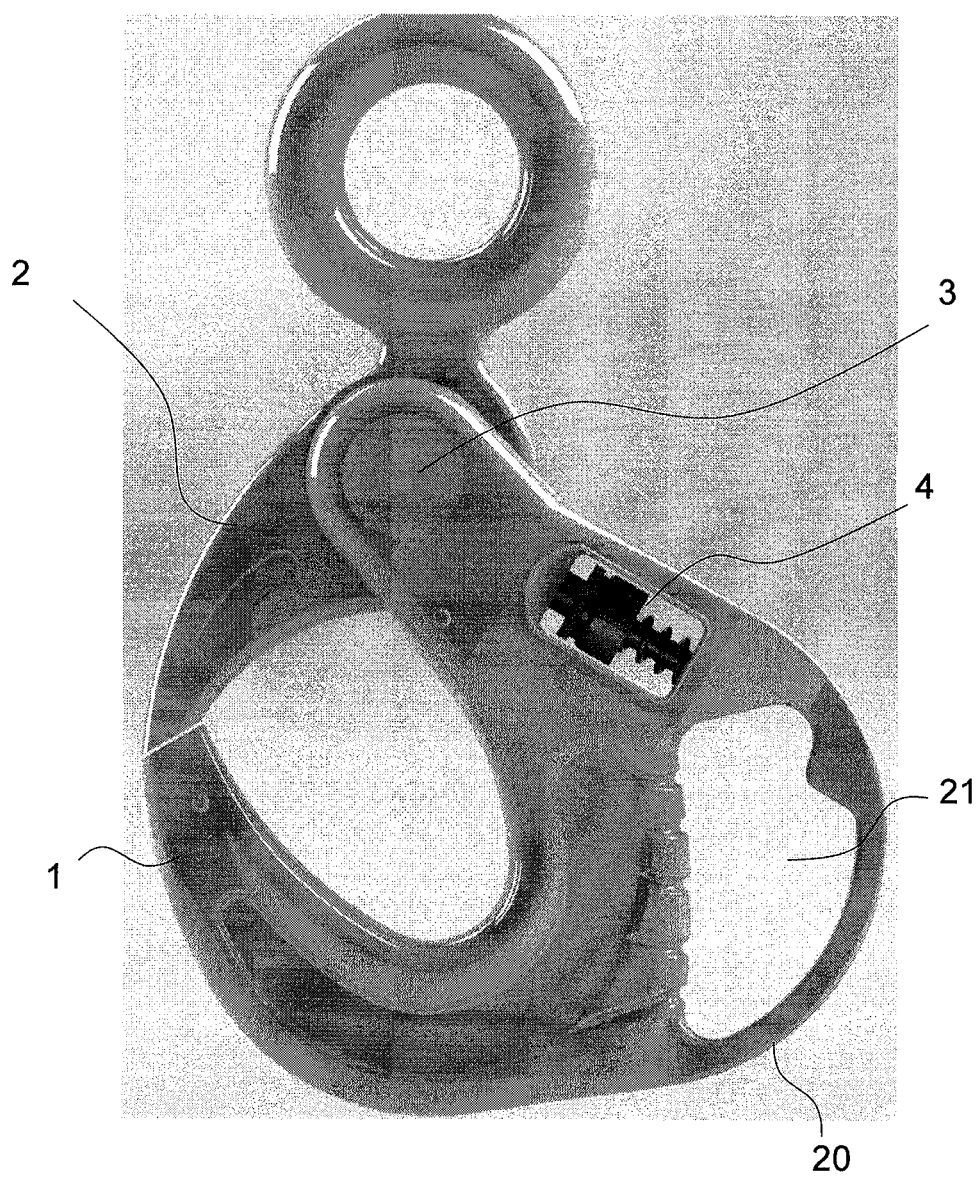
FIG. 8—Example hook in the closed configuration according to an embodiment.
Figure 9:
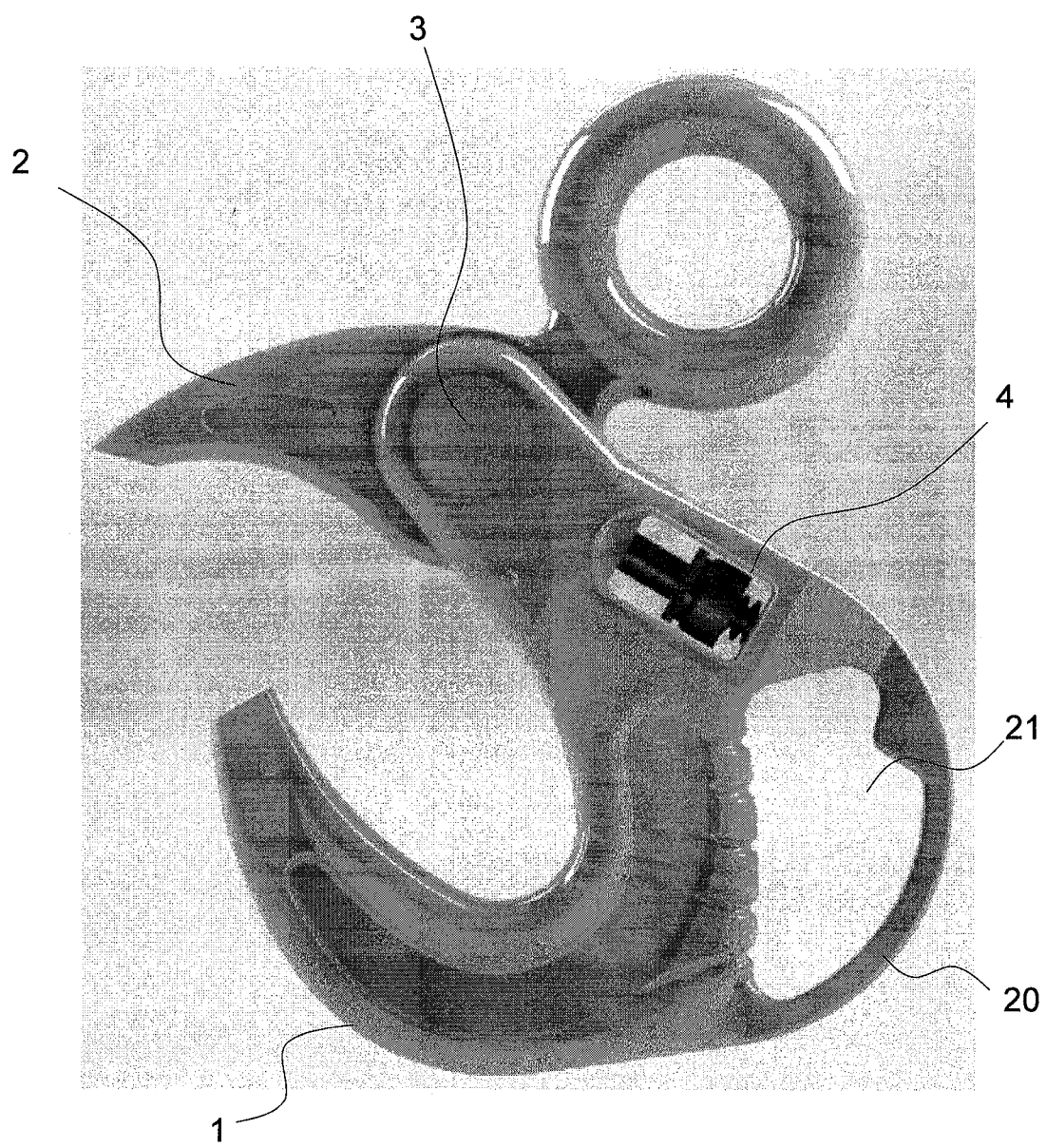
FIG. 9—Example hook in the open configuration according to an embodiment.
Figure 10:
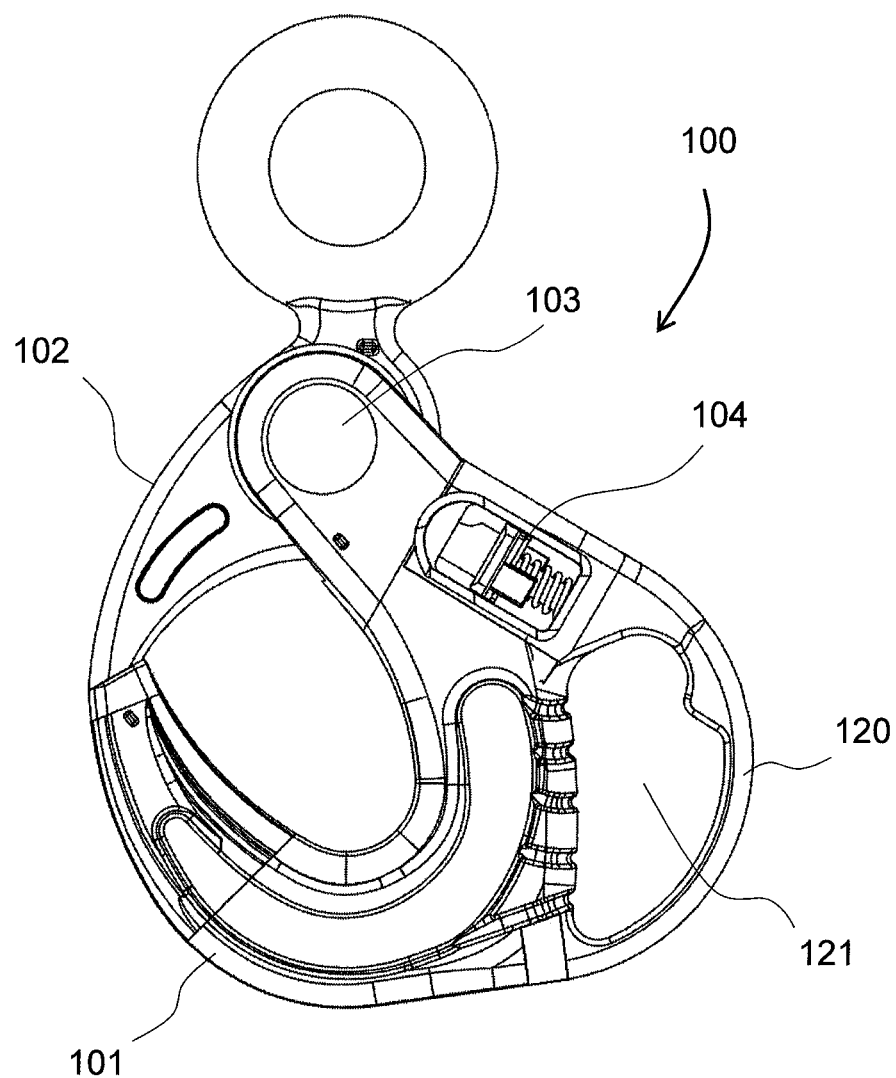
FIG. 10—A side view of an example hook according to an embodiment.
Figure 11:
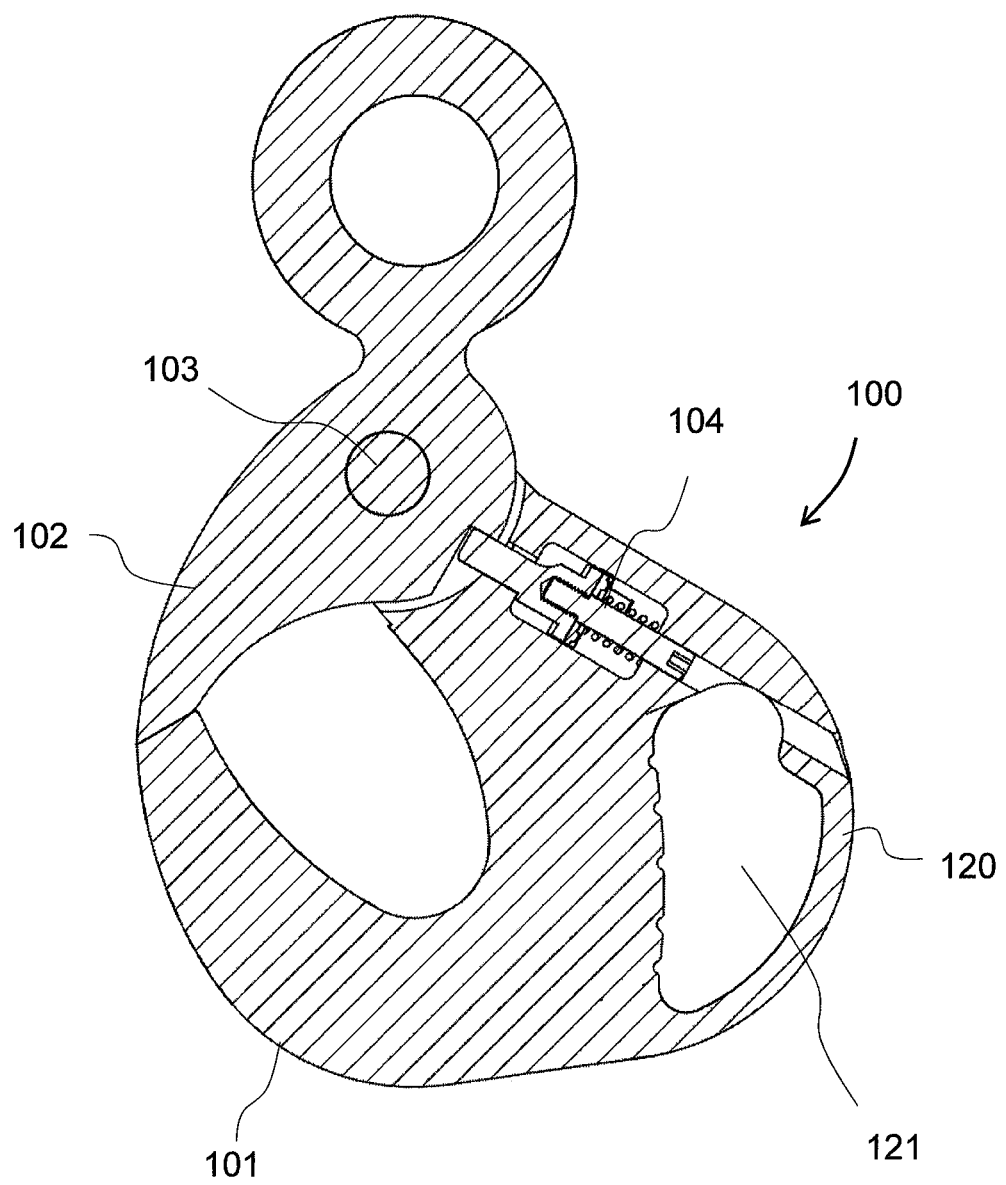
FIG. 11—A side section view of the example hook of FIG. 10.

A hook according to one embodiment of the invention is shown in FIGS. 8 (closed configuration) and 9 (open configuration).

Figure 1:
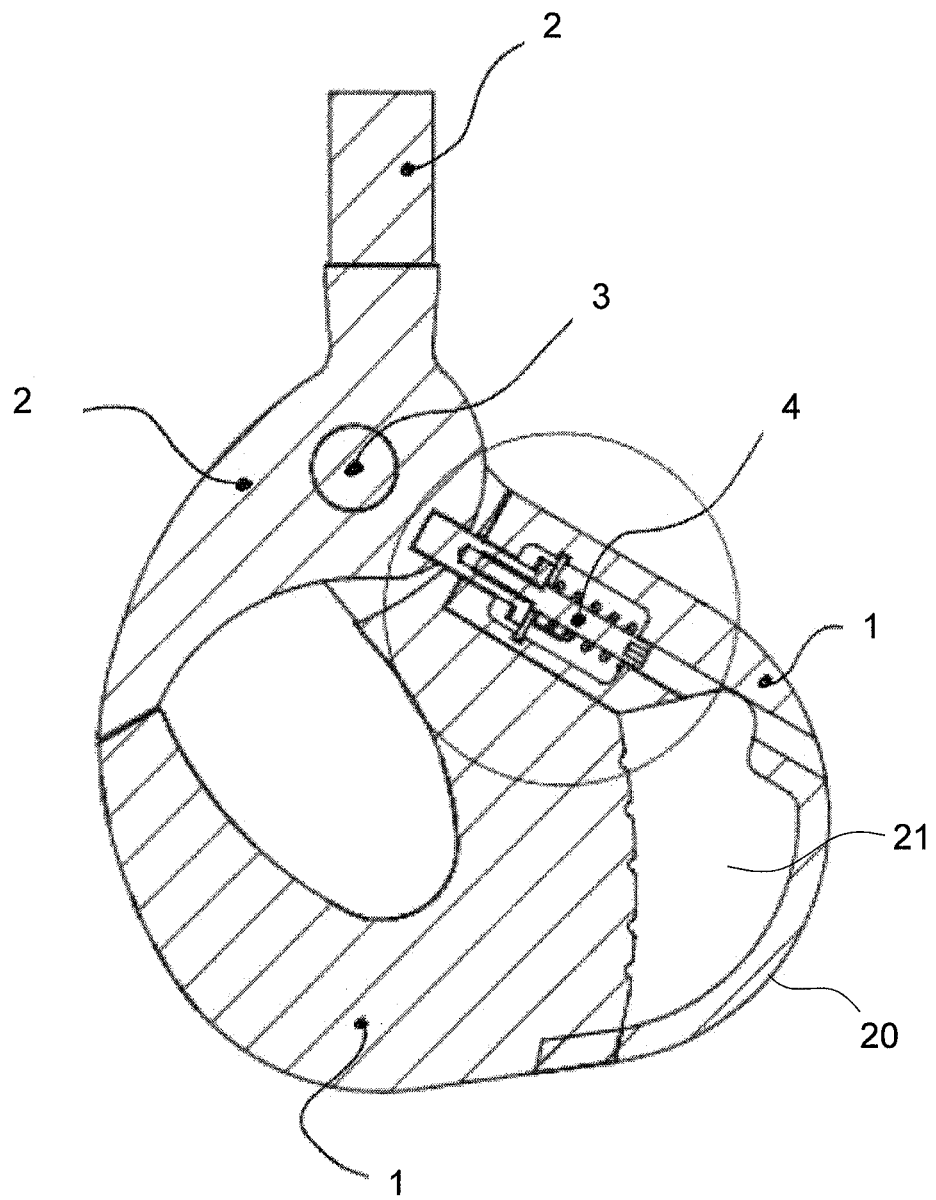
FIG. 1—Shows a cross section of a safety hook in the closed configuration.
Figure 2:
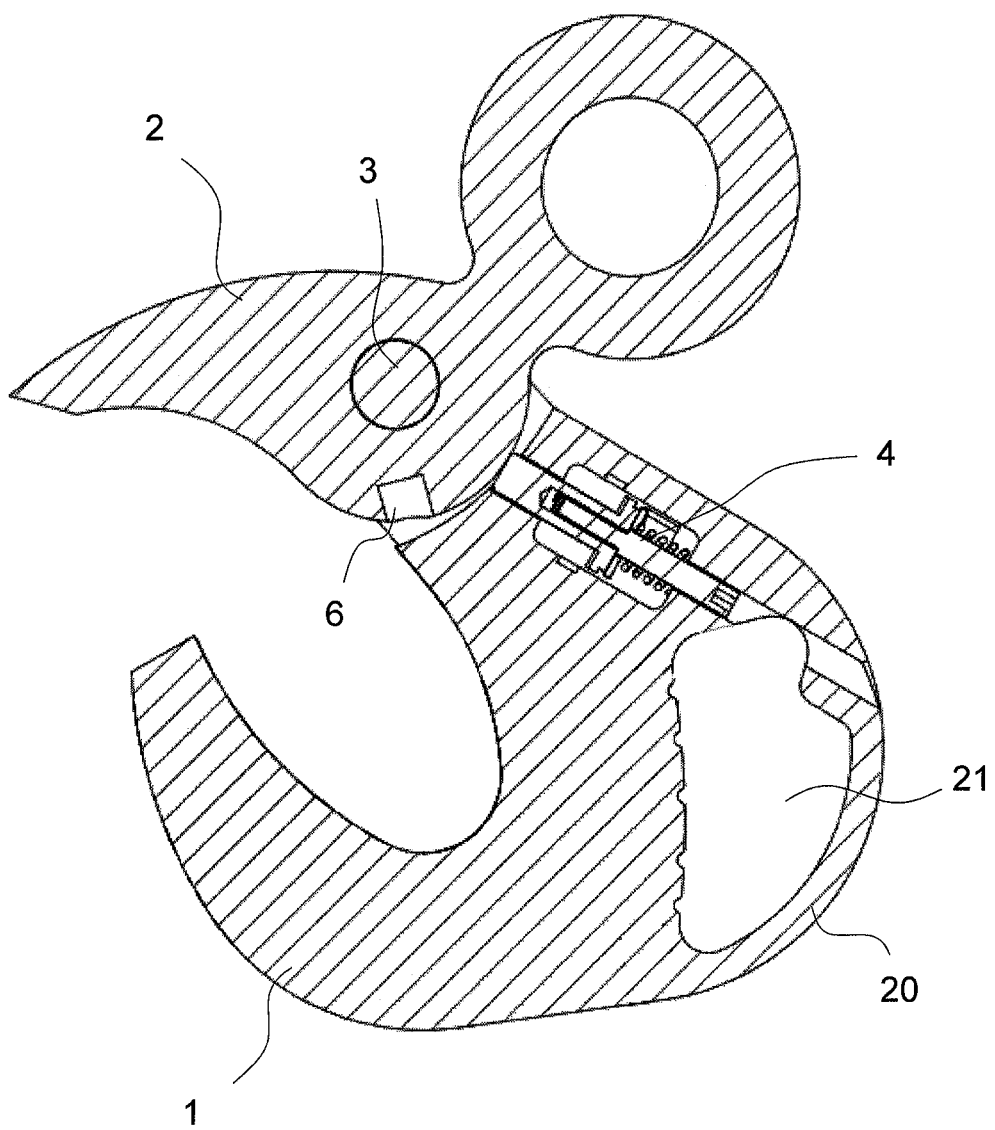
FIG. 2—Shows a cross section of a safety hook in the open configuration.

With reference to FIGS. 1 and 2, a hook comprises a main body 1 (corresponding to the hook body) and a locking arm 2 (corresponding to a hook arm). The main body 1 and the locking arm 2 are pivotably connected by the pin 3 such that the locking arm 2 and main body 1 may move between a closed position (FIG. 1) and an open position (FIG. 2).

The hook comprises a lock mechanism 4 (acting as a locking mechanism) that locks the locking arm 2 and main body 1 in a closed configuration.

The hook comprises a handle 20 that is continuous with the main body 1 and an aperture 21 is defined between the handle and the main body 1 within which the fingers of a user may be received when the user holds the handle.

With reference to FIGS. 3 to 7, the lock mechanism 4 is located within a cavity 8 within the main body 1 and comprises a lock pin 5 (acting as a locking element), a spring 7 (acting as a biasing means), an actuator 16, a lock shaft 17 and a lock securing device. The lock securing device comprises a keeper piece 10 (acting as a rotatable locking element), two actuators 12, and a keeper protrusion 13 (acting as a retaining formation). The keeper piece 10 comprises two eccentric keeper nibs 11 (acting as lock formations) off-set from the actuators 12.

With reference to FIGS. 6 and 7, the lock shaft 17 is screwed into the lock pin 5 through the actuator 16. The lock shaft 17 also extends through the spring 7, such that the spring 7 extends along the lock shaft 17 from the actuator 16 of the lock mechanism 4 to the side of the cavity 8 furthest from the locking arm 2. The lock securing device comprises a keeper piece 10 and is mounted on the lock shaft 17 and is held in place by the spring 7. The keeper piece 10 is rotatable about the lock shaft 17.

The sides of the main body 1 defining the cavity 8 comprise two main body slots 9 (acting as grooves) arranged next to the two eccentric keeper nibs 11 of the keeper piece 10. Accordingly, as the keeper piece 10 is rotated, the two eccentric keeper nibs 11 are moved into or out of the main body slots 9.

Figure 3:
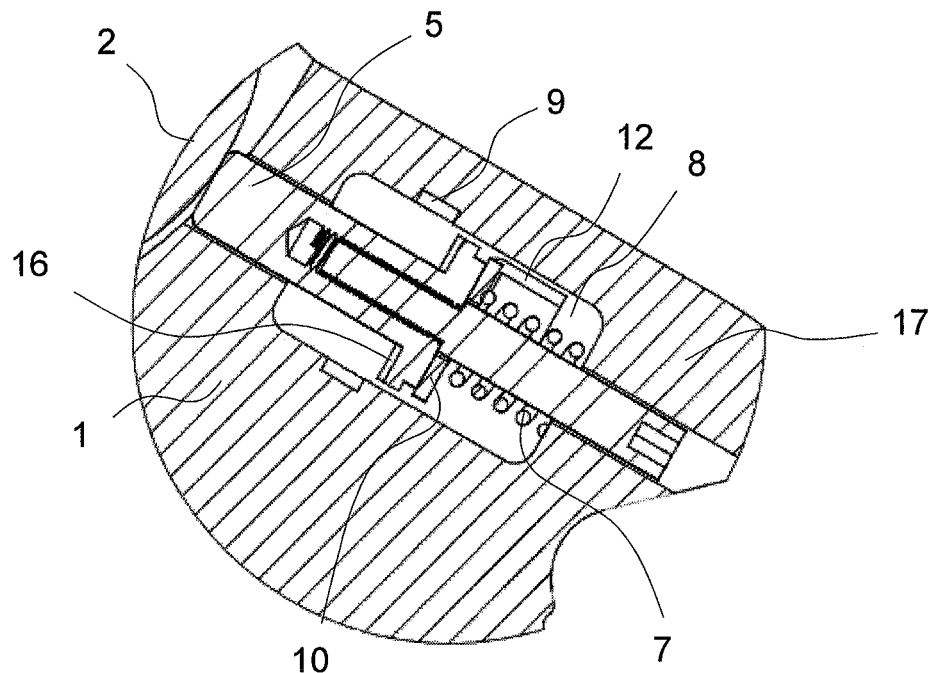
FIG. 3—Expanded cross section of a hook locking mechanism with the hook in the open configuration.
Figure 4:
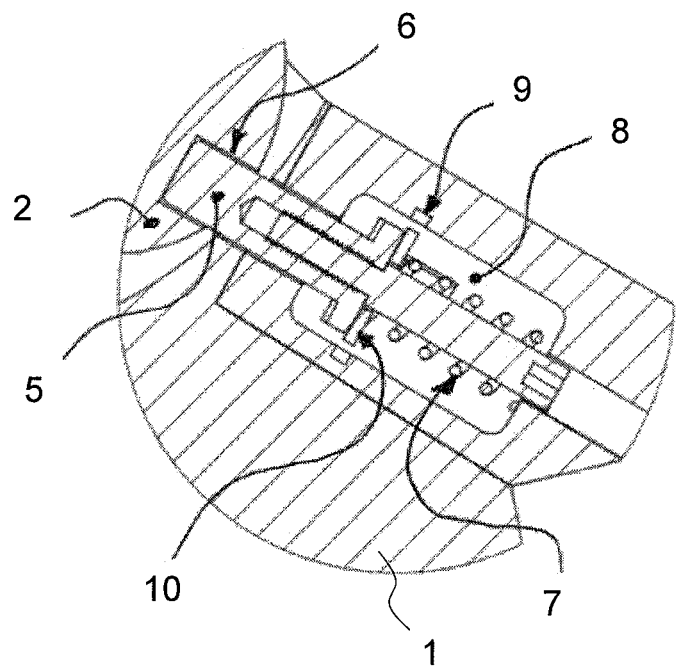
FIG. 4—Expanded cross section of a hook locking mechanism with the hook in the closed configuration and locking mechanism engaged.
Figure 5:
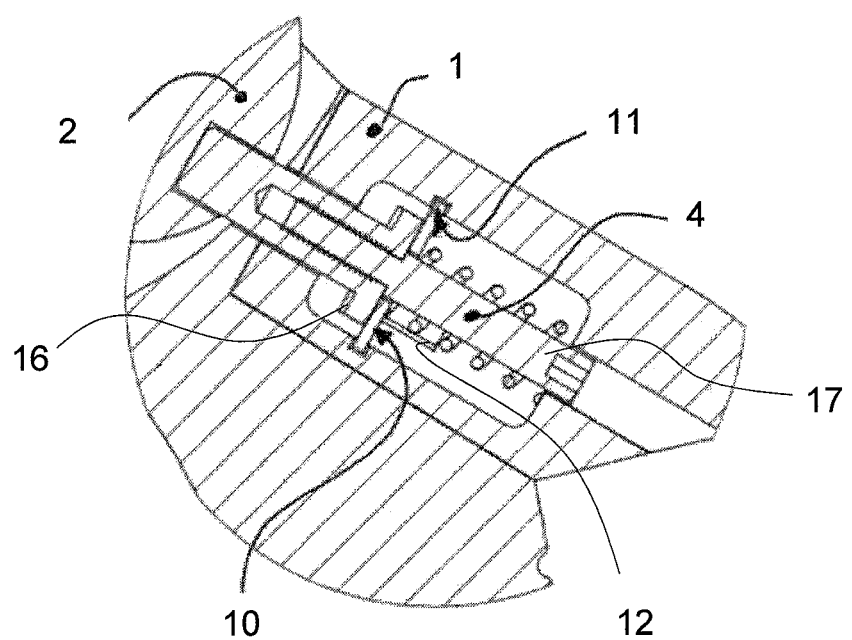
FIG. 5—Expanded cross section of a hook locking mechanism with the hook in the closed configuration, the locking mechanism engaged and a lock securing device engaged.

With reference to FIGS. 3 and 4, the keeper piece 10 is in the disengaged position where the eccentric keeper nibs 11 are not engaged into the main body slots 9. The keeper piece 10 is retained in the disengaged position by the keeper protrusion 13 being held in the corresponding disengaged groove (acting as a second retaining groove) 14 of the lock pin 5 under tension from the spring 7 (see FIGS. 6 and 7). In this configuration the lock mechanism is free to be operated/activated in a normal manner between the locked and unlocked positions by placing the thumb of the user against the actuator 16 and sliding it back against the tension of the spring 7, which moves the lock pin 5 out of engagement with a lock notch 6 (acting as a recess) of the locking arm 2 thereby allowing the hook to be opened and closed in use. The keeper piece 10 is in the disengaged position and the lock mechanism 4 functions in its normal manner.

In the double locked configuration, the lock pin 5 is retained within the lock notch 6 of the locking arm 2 and is biased towards the locking arm 2 by the spring 7. Accordingly, the locking arm 2 and main body 1 are locked in the closed configuration. The two eccentric keeper nibs 11 are located within the main body slots 9 thereby preventing the lock pin 5 from moving out of the lock notch 6. The keeper protrusion 13 moves out of the disengaged groove 14 against the bias of the spring 7 and is rotated into an engaged groove 15 (acting as a first retaining groove) on the rear of the lock pin 5 whereby the eccentric keeper nibs 11 engage into the main body slots 9 thus preventing movement of the lock mechanism 4 from normal activation or operation.

Once rotated into the engaged position the keeper piece 10 is retained in the double locked engaged position by the bias of spring 7. In this double locked configuration the lock mechanism 4 is prevented from movement or activation by the user or by any abnormal forces. Accordingly, the hook remains in a secure, double locked, configuration.

When the hook is to be opened, the user grips the hook via the handle 20 and uses the thumb of the hand holding the handle to use one or both of the actuators 12 to rotate the keeper piece 10. Accordingly, the two eccentric keeper nibs 11 are rotated out of the main body slots 9, thereby releasing the lock mechanism 4. The user then uses the same thumb to activate the actuator 16 of the lock mechanism 4, drawing the locking pin 5 of the lock mechanism 4 out of the locking arm notch 6, releasing the locking arm 2. The main body 1 can then be rotated about the pin 3 and the hook opened. A load (not shown) may then be either attached to the hook or removed from the hook.

In the case where a load is being attached to the hook, the main body 1 is swung closed and the spring 7 of the locking mechanism 4 is urged into the locking arm notch 6 to lock the position of the main body 1 and the locking arm 2. The user may then elect to double lock the hook by placing their thumb on the actuator 12 and using the actuator 12 to rotate the keeper piece 10 from the disengaged position 14 to the engaged position 15.

The hook is now returned to the "double locked" configuration.

In more detail, when the keeper piece 10 is engaged to double lock the hook, the keeper piece 10 is initially held in a disengaged groove 14 by a keeper protrusion 13 and the tension of the spring 7 acting on the keeper piece 10. Then, when using the user's thumb to rotate the actuator 12 clockwise (about 30 degrees) the keeper protrusion 13 moves out of the disengaged groove 14 against the spring 7 until the keeper protrusion 13 is forced into the engaged groove 15 by the spring 7. The two eccentric keeper nibs 11 are now engaged in the main body slots 9 such that the lock mechanism 4 is now restricted from operational movement and the hook is double locked.

Example 2

Figure 12:
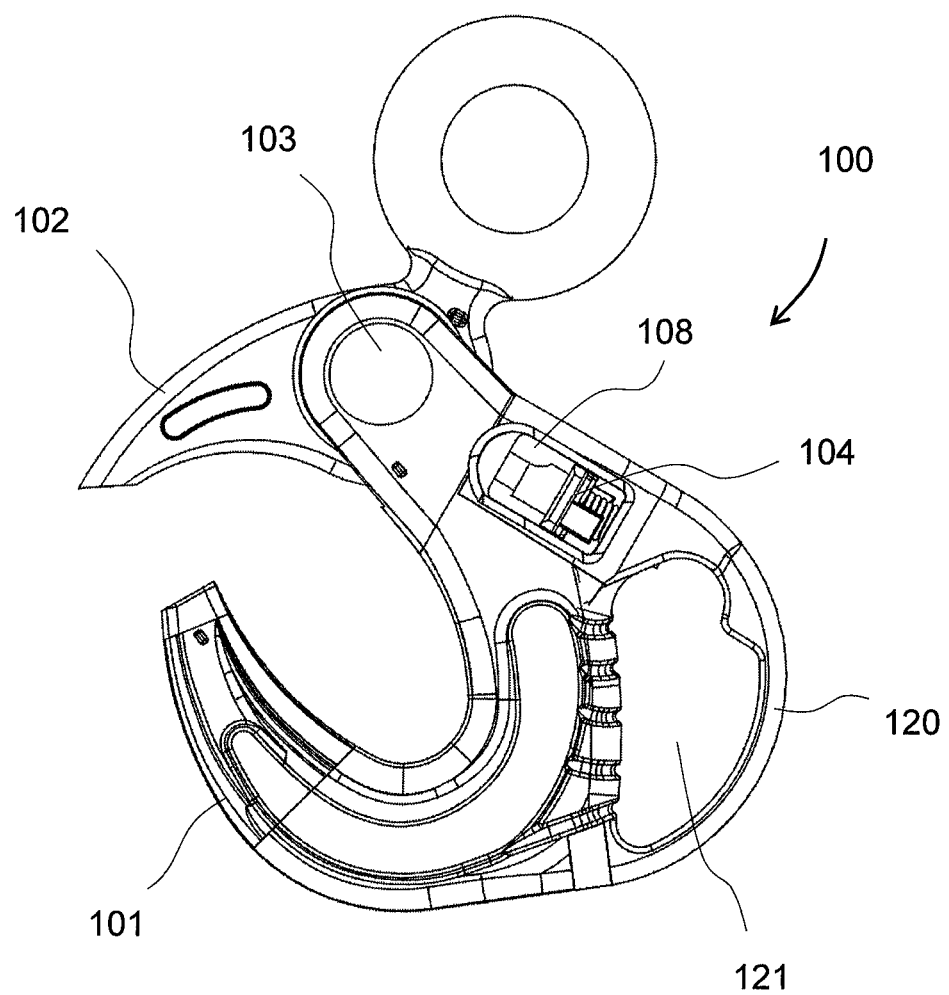
FIG. 12—A side view of an example hook according to an embodiment in an open configuration.
Figure 13:
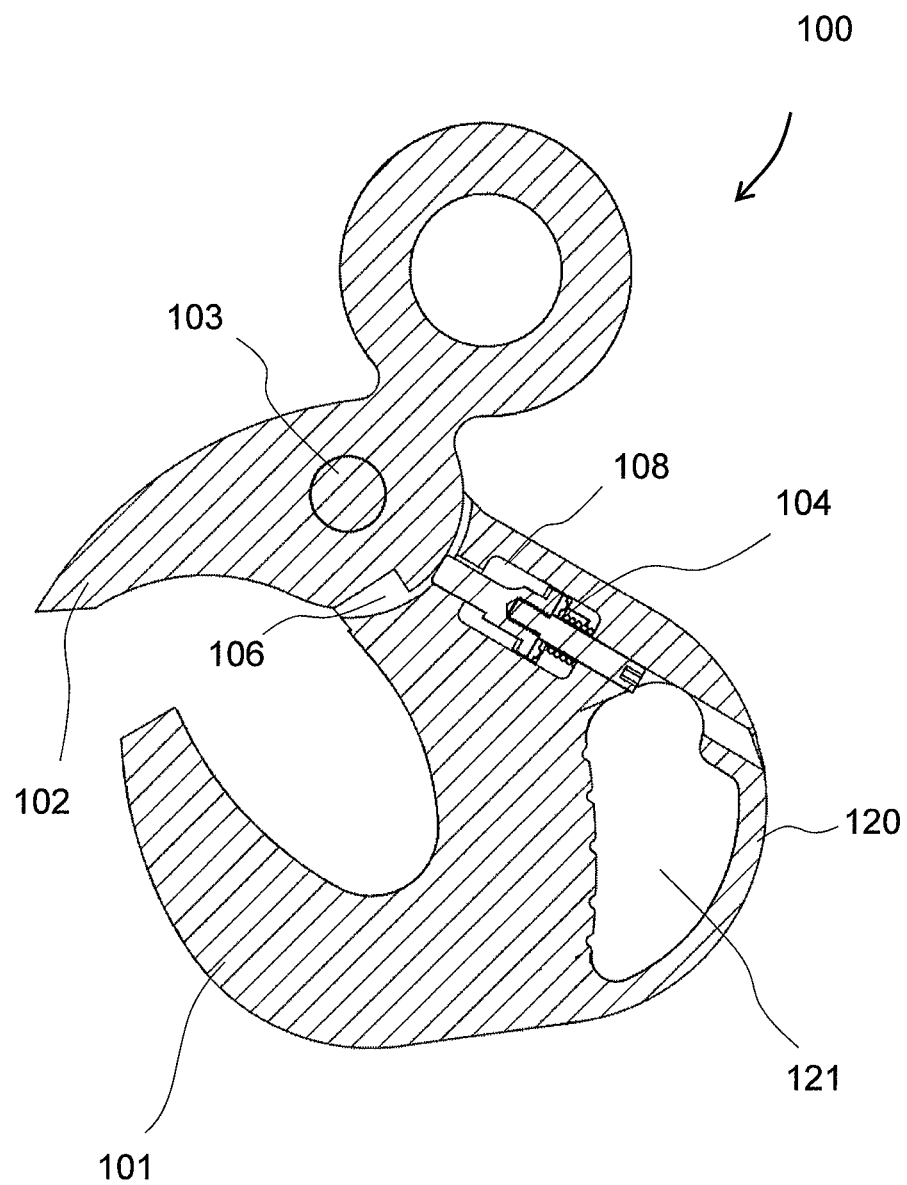
FIG. 13—A side section view of the example hook according to an embodiment in an open configuration.

With reference to FIGS. 10 to 19 a safety hook 100 comprises a main body 101 (corresponding to the hook body) and a locking arm 102 (corresponding to a hook arm). The main body 101 and the locking arm 102 are pivotably connected by a pin 103 such that the locking arm 102 and main body 101 may move between a closed position (FIGS. 10 and 11) and an open position (FIGS. 12 and 13).

The hook comprises a lock mechanism 104 (acting as a locking mechanism) that locks the locking arm 102 and main body 101 in a closed configuration.

The hook comprises a handle 120 that is continuous with the main body 101 and an aperture 121 is defined between the handle 120 and the main body 101 within which the fingers of a user may be received when the user holds the handle 120.

Figure 14:
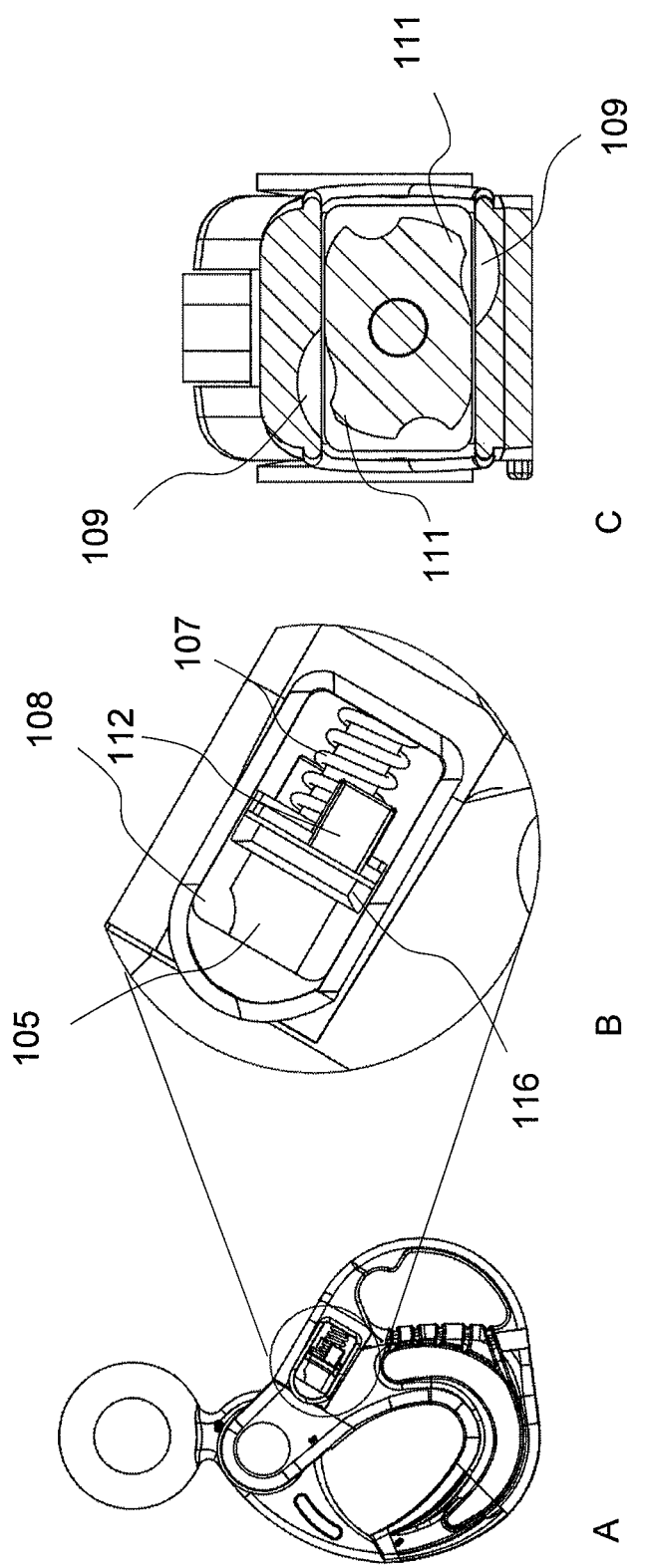
FIG. 14—A) A side view of a hook according to an embodiment, B) a zoomed-in view of the locking mechanism of the hook, C) A front-on view of the locking mechanism with the lock formations disengaged.
Figure 15:
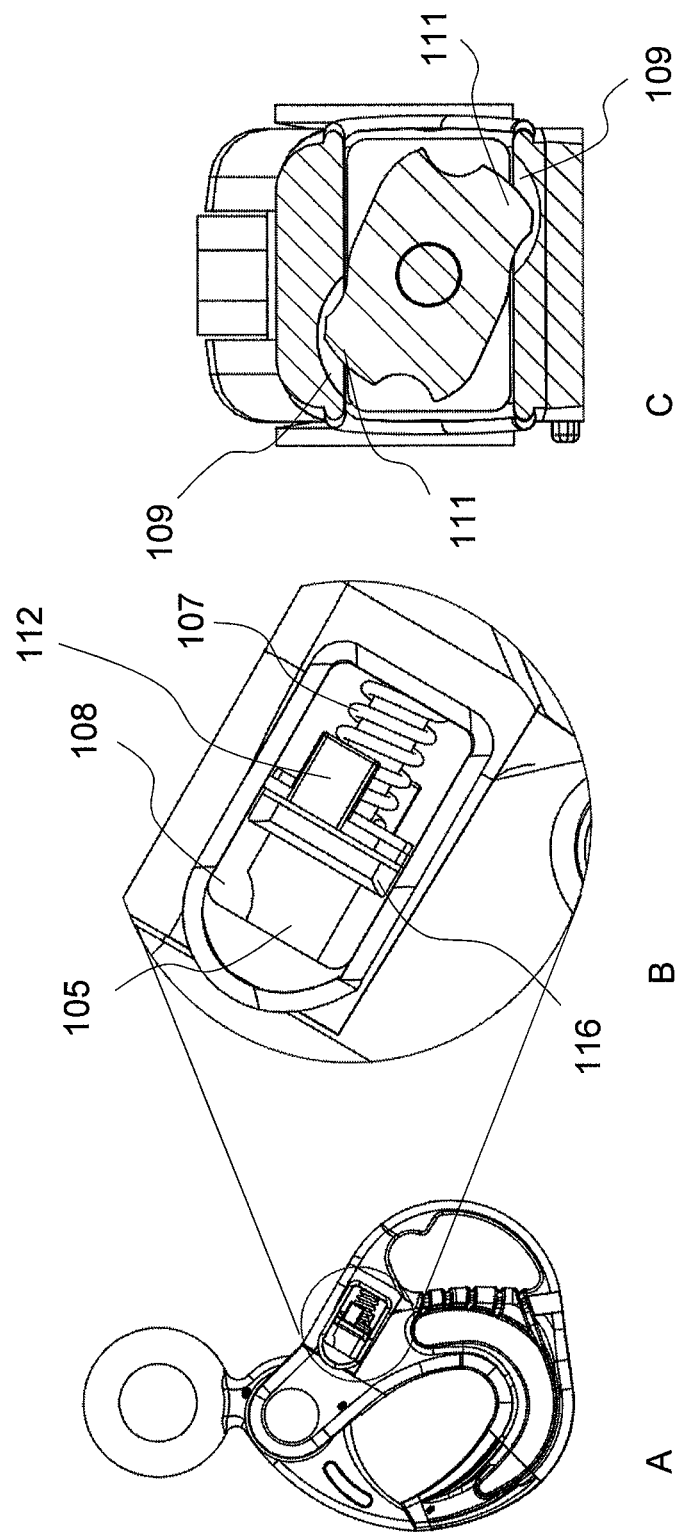
FIG. 15—A) A side view of a hook according to an embodiment, B) a zoomed-in view of the locking mechanism of the hook, C) A front-on view of the locking mechanism with the lock formations engaged.

With reference to FIGS. 14 and 15, the lock mechanism 104 is located within a cavity 108 within the main body 101 and comprises a lock pin 105 (acting as a locking element), a spring 107 (acting as a biasing means), an actuator 116, a lock shaft and a lock securing device. The lock securing device comprises a keeper piece 110 (acting as a rotatable locking element), two actuators 112, and a keeper protrusion 113 (acting as a retaining formation). The keeper piece 110 comprises two eccentric keeper nibs 111 (acting as lock formations) offset from the actuators 112.

Figure 16:
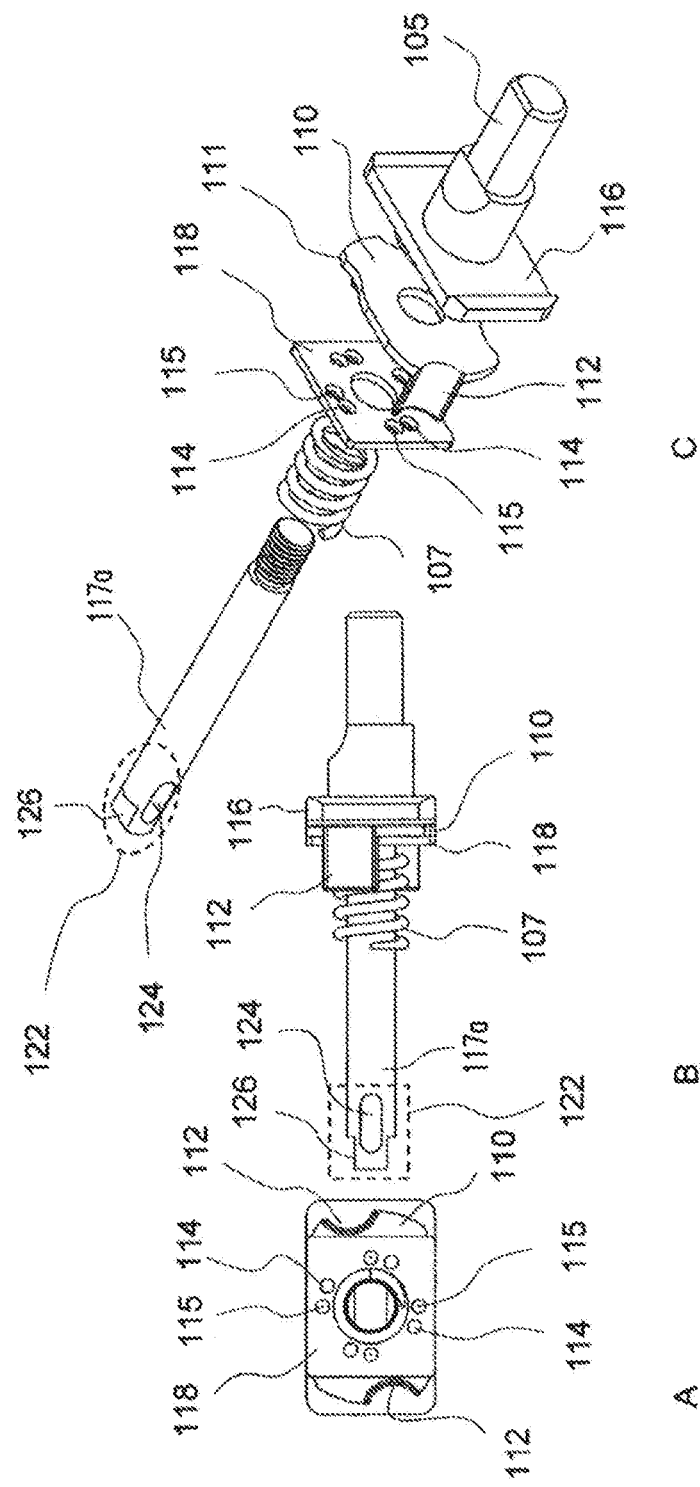
FIG. 16—Views of a lock mechanism from a hook according to an embodiment with lock formations in the disengaged position A) a front view of the locking mechanism B) a side view of the locking mechanism, C) an exploded view of the lock mechanism.
Figure 17:
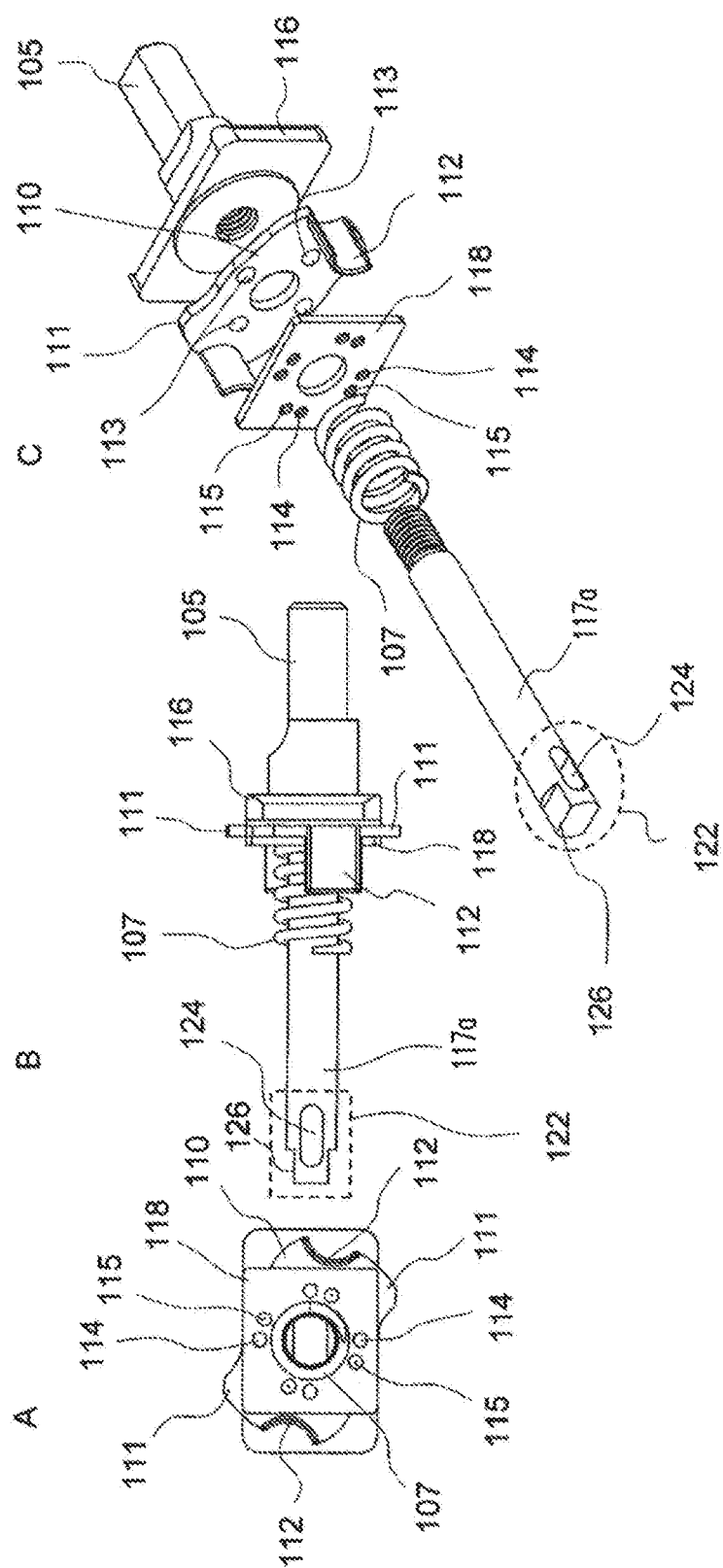
FIG. 17—Views of a lock mechanism from a hook according to an embodiment with lock formations in the engaged position A) a front view of the locking mechanism B) a side view of the locking mechanism, C) an exploded view of the lock mechanism.

With reference to FIGS. 16 and 17, the lock shaft 117a is screwed into the lock pin 105 through the actuator 116. The lock shaft 117a also extends through the spring 107, such that the spring 107 extends along the lock shaft 117a from the actuator 116 of the lock mechanism 104 to the side of the cavity 108 furthest from the locking arm 102. The lock securing device comprises a keeper piece 110 and is mounted on the lock shaft 117a and is held in place by the spring 107. The keeper piece 110 is rotatable about the lock shaft 117a.

The sides of the main body 101 defining the cavity 108 comprise two main body slots 109 (acting as grooves) arranged next to the two eccentric keeper nibs 111 of the keeper piece 110. Accordingly, as the keeper piece 110 is rotated, the two eccentric keeper nibs 111 are moved into or out of the main body slots 109 to thereby lock the lock mechanism in place.

During use, the operator holds the handle of the hook and then places the thumb of the hand holding the handle on the lock mechanism actuator 116 and draws the entire lock mechanism 104 rearwards against the tension of the spring 107. The lock pin 105 thereby disengages from the locking arm notch 106 to allow the hook main body 101 to be opened and rotated about the loadbearing pin 103. Once the hook 100 is opened the load sling or Masterlink etc. is loaded into the hook 100 and the hook body 101 is either swung closed, or let go, whereby the hook automatically locks in the closed position due to the offset main pin 103. The locking mechanism 104 then automatically re-engages the lock pin 105 into the locking arm notch 106 at which point the hook 100 is loaded and singularly locked closed.

The operator can then elect to double lock the hook 100, and absolutely ensure the load integrity by simply placing the thumb of the hand holding the hook on the double locking keeper actuator 112 and rotating the keeper piece 110 in a clockwise direction from the disengaged position to the engaged position.

In the disengaged configuration it can be seen from FIG. 17, for example, that the four keeper protrusions 113—acting as retaining formations—for the keeper piece 110 are held within four corresponding and disengaged hole positions 114 of a spring washer 118 by the tension of the spring 107 acting on both the keeper piece 110, the spring washer 118 and the entire lock mechanism 104. In this position the two eccentric keeper nibs 111 of the keeper piece 110 are not engaged into the main body locking slots 109. The keeper piece 110, spring washer 118 and entire lock mechanism 104 are free to move against the bias of the spring 107 within the lock recess 108, thus allowing normal activation and movement of the entire lock mechanism 104 by operation of the lock actuator 116 to unlock and load the hook 100.

The spring washer 118 is prevented from rotation place by the nature of its fit within the main body lock recess 108.

Once the hook 100 is loaded and is locked in the default closed position the operator can electively double lock the hook 100 by placing the thumb of the hand holding the handle 120 on the keeper actuator 112 and flicking, or rotating, the keeper piece 110 in a clockwise direction whereby the four protruding formations 113 on keeper piece 110 move out from the disengaged position holes 114 on spring washer 118. As the keeper actuator 112 is rotated the protrusions 113 come out of the holes 114 pushing the spring washer 118 back against the tension of the spring 107 rotating further until the four protrusion formations 113 engage into the four locked position holes 115 of the spring washer 118 and held in place by the tension of spring 107 which also engages the two eccentric locking nibs 111 of the keeper piece 110 into the corresponding locking slots 109 recessed within the main body 102. The keeper piece formations 113 are held in the locked position holes 115 by spring tension 107 pushing on the spring washer 118 and the keeper piece 110 thus the hook is now double locked.

To disengage the double lock the operator need simply flick the keeper actuator 112 in the anticlockwise direction until it clicks into the unlocked position and held there by the spring tension then open the hook 100 normally by operation of the lock mechanism actuator 116.

Figure 18:
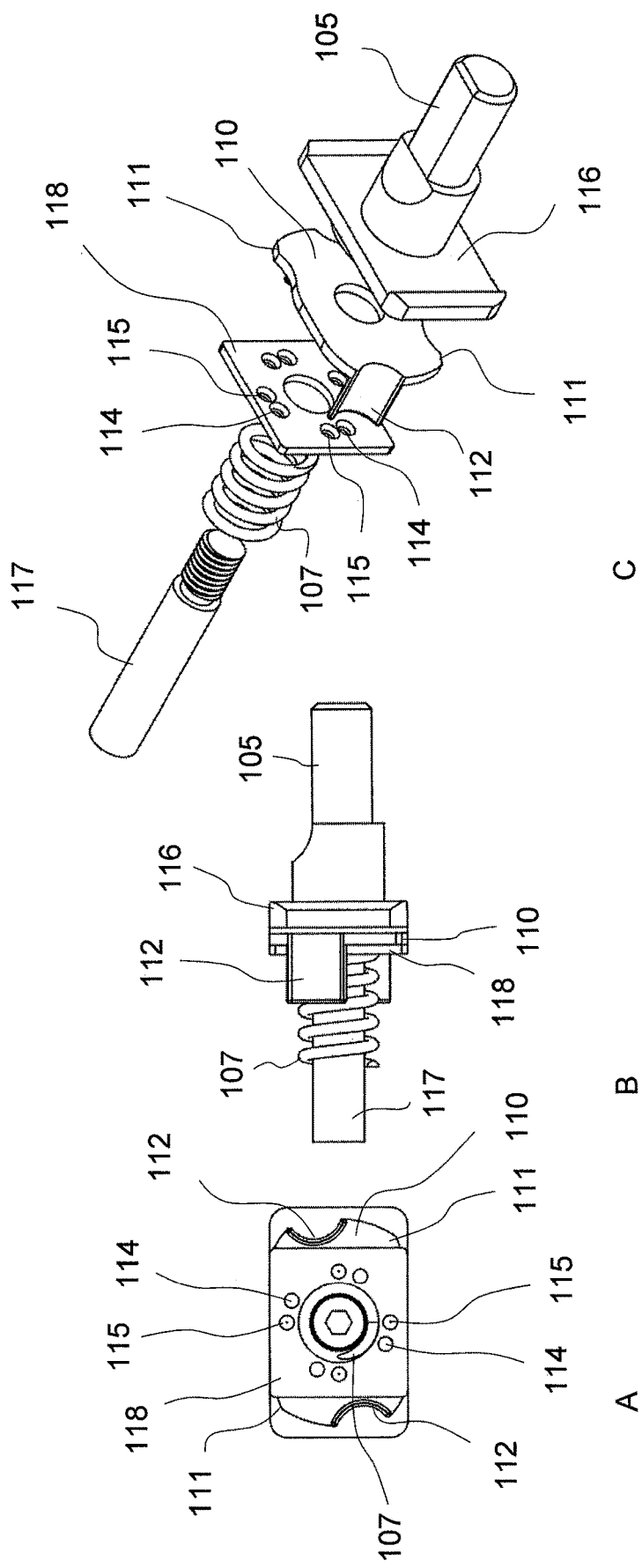
FIG. 18—Views of a lock mechanism from a hook according to an embodiment with lock formations in the disengaged position A) a front view of the locking mechanism B) a side view of the locking mechanism, C) an exploded view of the lock mechanism.
Figure 19:
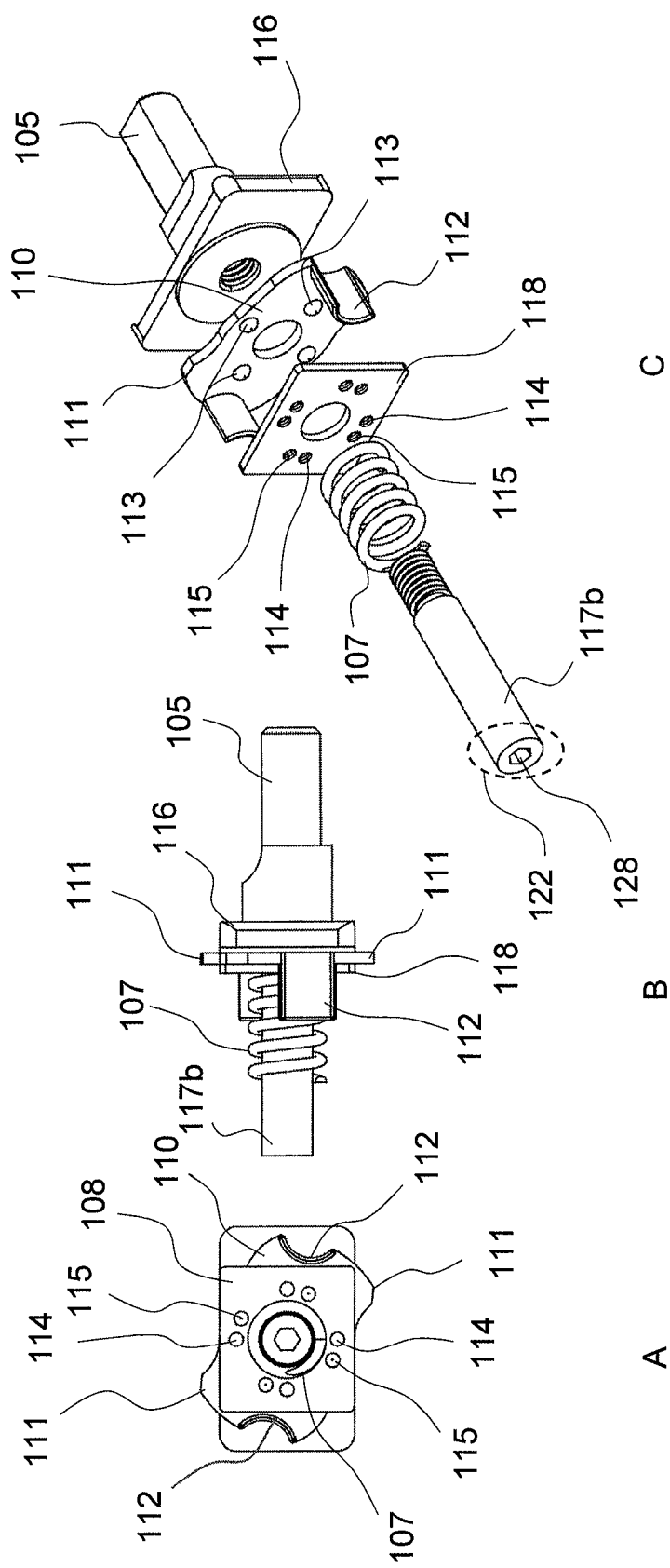
FIG. 19—Views of a lock mechanism from a hook according to an embodiment with lock formations in the engaged position A) a front view of the locking mechanism B) a side view of the locking mechanism, C) an exploded view of the lock mechanism.

With reference to FIGS. 16 to 17, the lock shaft 117a has a formation 122 to configured to secure the lock mechanism within the hook body 101. The formation 122 comprises an aperture 124 and a cooperating formation 126 to be inserted into a complementary formation in the hook body 101 to allow the lock shaft 117a to be secured into the hook body 101. In an alternative example, as shown in FIGS. 18 and 19, the formation 122 comprises a shaped aperture 128 configured to receive a formation in the hook body 101 to thereby secure the lock mechanism 104 within the hook body 101.

Example 3

Figure 20:
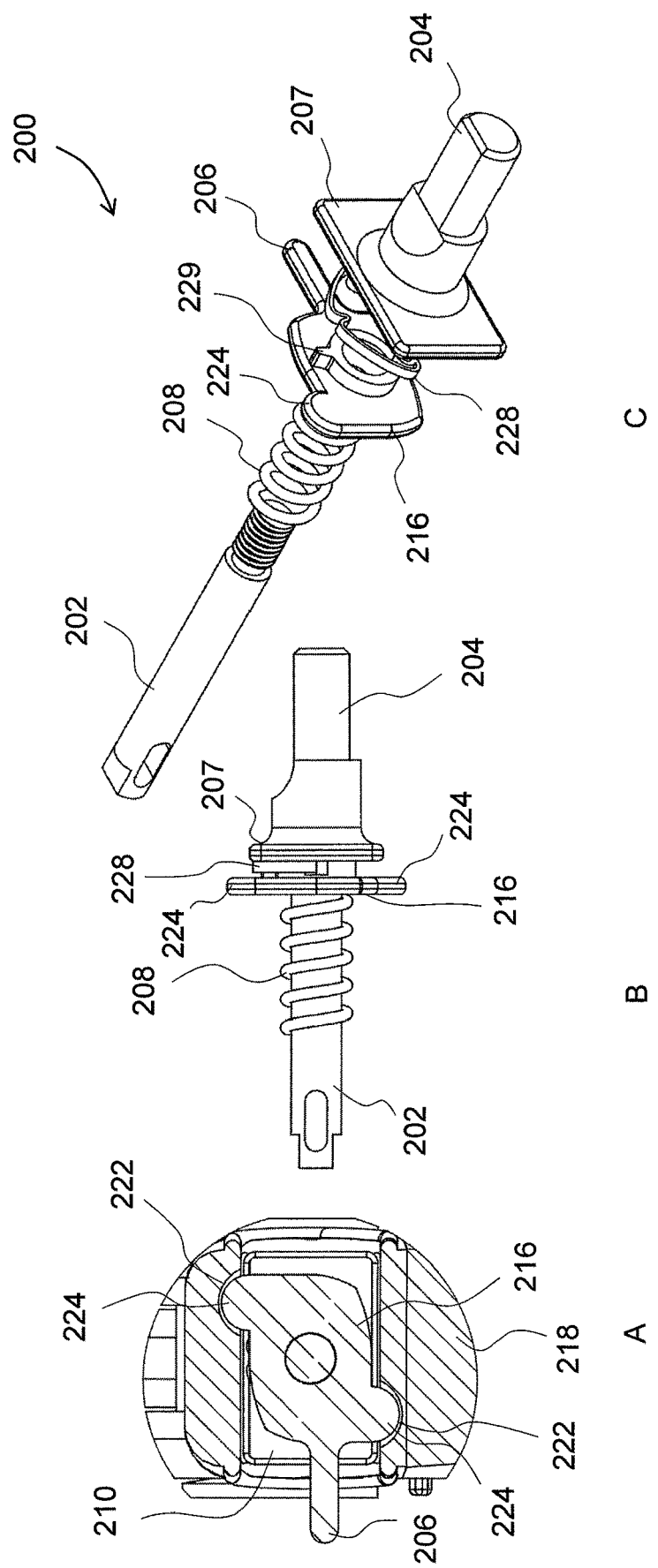
FIG. 20—Views of a lock mechanism from a hook according to an embodiment with lock formations in the engaged position A) a front view of the locking mechanism B) a side view of the locking mechanism, C) an exploded view of the lock mechanism.
Figure 21:
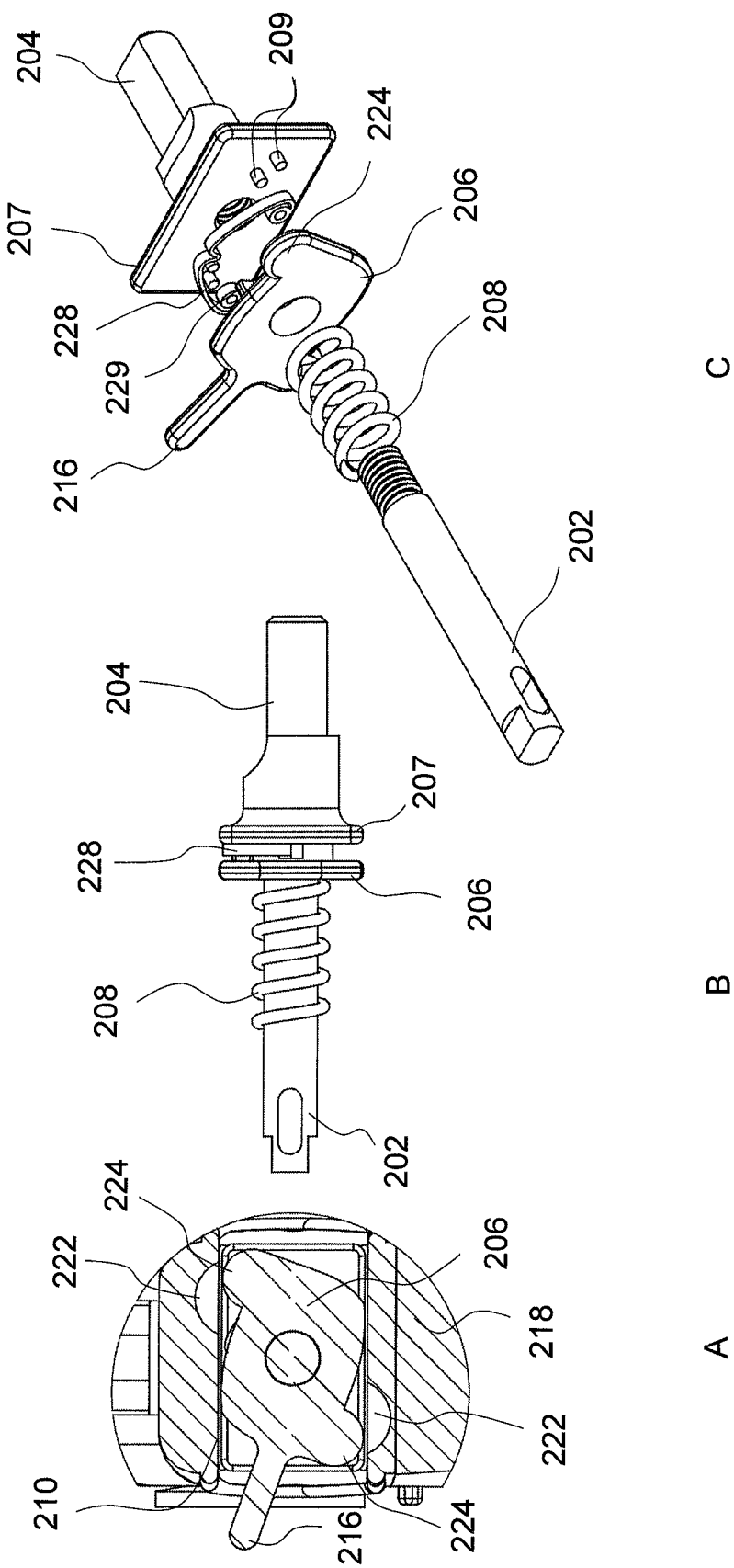
FIG. 21—Views of a lock mechanism from a hook according to an embodiment with lock formations in the engaged position A) a front view of the locking mechanism B) a side view of the locking mechanism, C) an exploded view of the lock mechanism.

An alternative example a hook according to Example 1 or Example 2 has an alternative lock mechanism. With reference to FIGS. 20 and 21, the lock mechanism 200 comprises a lock shaft 202 screwed into a lock pin 204 through a keeper piece 206. The lock pin 204 comprises a brace plate 207 (acting as an actuator). The brace plate 207 comprises supports 209. The lock shaft 202 also extends through the spring 208, such that the spring 208 extends along the lock shaft 202 from the keeper piece 206 of the lock mechanism 200 to the side of the cavity 210 furthest from the locking arm 212. The keeper piece 206 is mounted on the lock shaft 202 and is held in place by the spring 208. The keeper piece 206 is rotatable about the lock shaft 202.

The sides of the main body 218 defining the cavity 210 comprise two main body slots 222 (acting as grooves) arranged next to the two eccentric keeper nibs 224 (acting as lock formations) of the keeper piece 206. Accordingly, as the keeper piece 206 is rotated, the two eccentric keeper nibs 224 are moved into or out of the main body slots 222 to thereby lock the lock mechanism 200 in a locked configuration or to unlock the lock mechanism 200 into an unlocked configuration.

The keeper piece 206 comprises an elongate actuator 216, a torsion spring 228, and a torsion spring retaining formation 229. The torsion spring 228 is fixed to the supports 209 and urges the two eccentric keeper nibs 224 towards the main body slots 222 such that when the keeper piece 206 is adjacent to the main body slots 222 the two eccentric keeper nibs 224 are urged into the main body slots 222 to thereby automatically lock the locking mechanism 200. The elongate actuator 216 is configured to allow a user to rotate the keeper piece 206 between the locked configuration and the unlocked configuration against or with the force applied by the torsion spring 228 such that the user can unlock the lock mechanism as required.

Example 4

Figure 22:
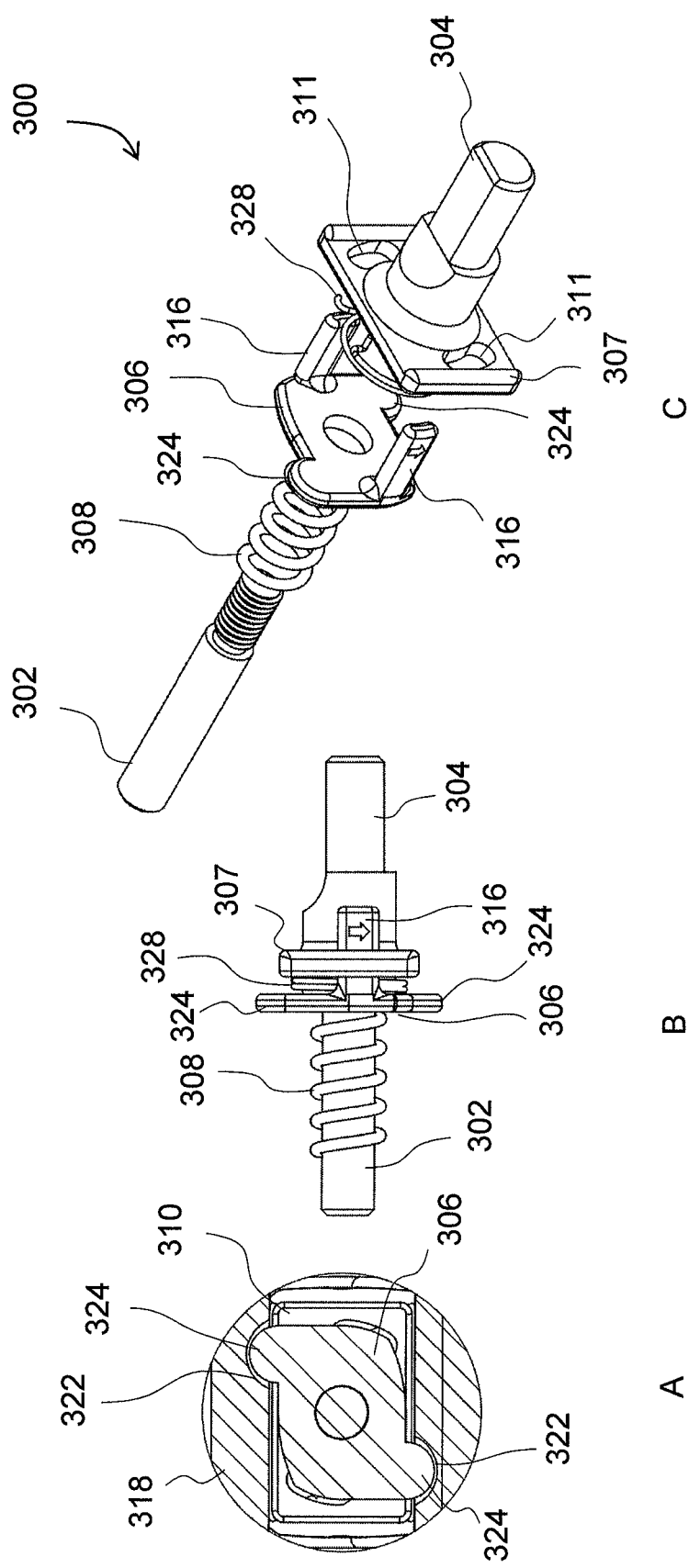
FIG. 22—Views of a lock mechanism from a hook according to an embodiment with lock formations in the engaged position A) a front view of the locking mechanism B) a side view of the locking mechanism, C) an exploded view of the lock mechanism.
Figure 23:
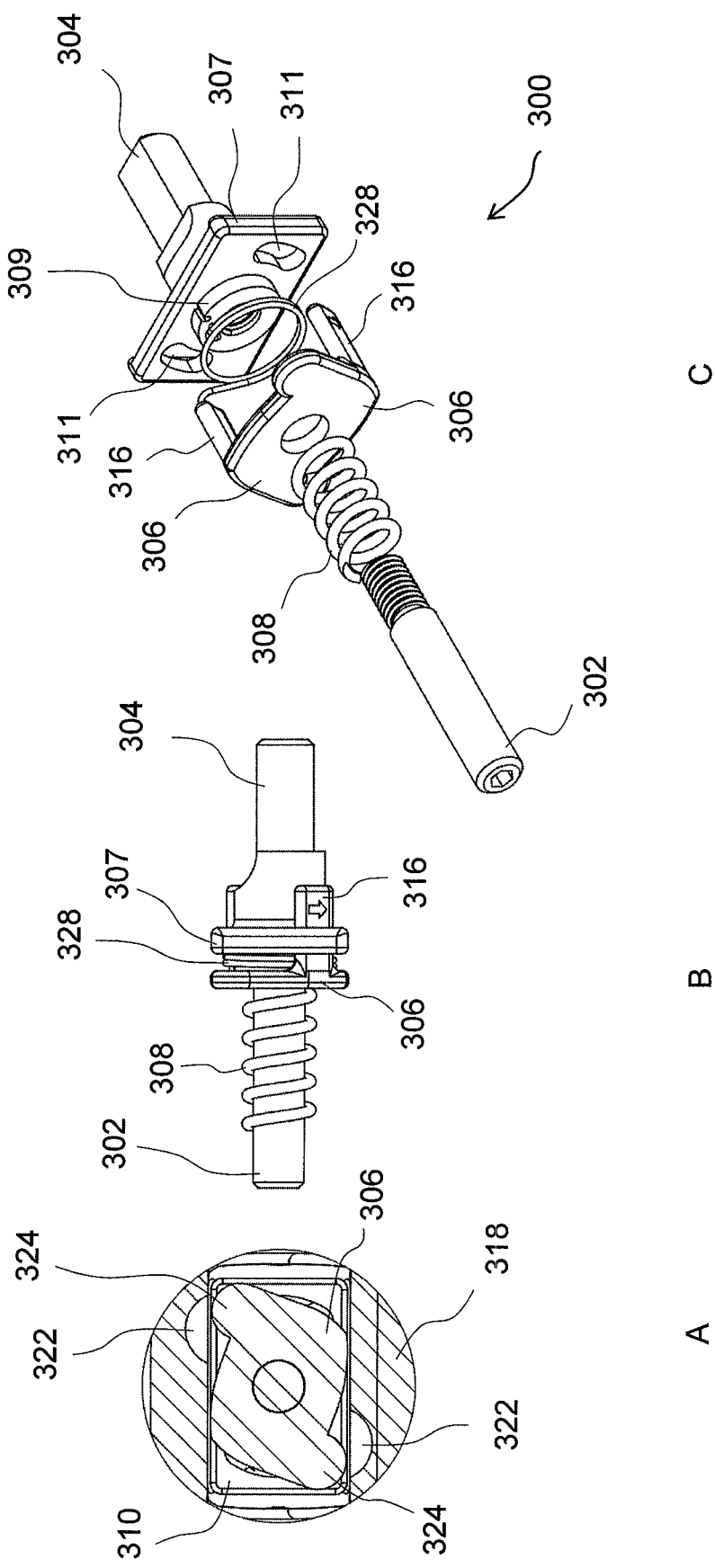
FIG. 23—Views of a lock mechanism from a hook according to an embodiment with lock formations in the engaged position A) a front view of the locking mechanism B) a side view of the locking mechanism, C) an exploded view of the lock mechanism.

A further alternative example hook according to Example 1 or Example 2 has a further alternative lock mechanism. With reference to FIGS. 22 and 23, the lock mechanism 300 comprises a lock shaft 302 screwed into a lock pin 304 through a keeper piece 306. The lock pin 304 comprises a brace plate 307 (acting as an actuator). The brace plate 307 comprises supports 309 and receiving slots 311. The lock shaft 302 also extends through the spring 308, such that the spring 308 extends along the lock shaft 302 from the keeper piece 306 of the lock mechanism 300 to the side of the cavity 310 furthest from the locking arm 312. The keeper piece 306 is mounted on the lock shaft 302 and is held in place by the spring 308. The keeper piece 306 is rotatable about the lock shaft 302. The keeper piece comprises two eccentric keeper nibs (acting as lock formations).

The sides of the main body 318 defining the cavity 310 comprise two main body slots 322 (acting as grooves)

arranged next to the two eccentric keeper nibs 324 of the keeper piece 306. Accordingly, as the keeper piece 306 is rotated, the two eccentric keeper nibs 324 are moved into or out of the main body slots 322 to thereby lock the lock mechanism 300 in a locked configuration or to unlock the lock mechanism 300 into an unlocked configuration.

The keeper piece 306 comprises a pair of actuators 316 and a coil keeper spring 328. The coil keeper spring 328 is mounted onto the support 309 and connected to one of the actuator 316, and urges the two eccentric keeper nibs 324 towards the main body slots 322 such that when the keeper piece is adjacent to the main body slots the two eccentric keeper nibs 324 are urged into the main body slots 322 to thereby automatically lock the locking mechanism 300. Each actuator 316 extends through a receiving slot 311 on the brace plate 307 and is configured to allow a user to rotate the keeper piece 206 between the locked configuration and the unlocked configuration.

Examples 3 and 4 automatically engage the keeper piece 206, 306 due to the provision of the torsion spring 228 and the coil keeper spring 328 respectively urging the eccentric keeper nibs into the main body slots when the hook in each example is locked to thereby automatically lock the locking mechanism in the locked configuration.

In a further example the torsion spring 228 of Example 3 can be replaced by an overlock leaf spring and the lock mechanism further comprises a cam (not shown) on support 229 to retain the eccentric keeper nibs 224 in either the engaged or disengaged configuration. Accordingly, the hook of that example may be operated by subsea ROV, for example.

While there has been hereinbefore described an approved embodiment of the present invention, it will be readily apparent that many and various changes and modifications in form, design, structure and arrangement of parts may be made for other embodiments without departing from the invention and it will be understood that all such changes and modifications are contemplated as embodiments for other safety hooks as a part of the present invention as defined in the appended claims.

The invention claimed is:

1. A hook comprising a hook body, a hook arm, a locking mechanism, and a lock securing device; the hook arm being pivotably coupled to the hook body such that the hook arm and hook body are pivotable relative to one another between an open configuration in which the hook arm and the hook body together define a discontinuous boundary, and a closed configuration in which the hook arm and the hook body define a substantially continuous boundary; the locking mechanism being configured to lock the hook arm in at least the closed configuration; the lock securing device being configured to move between an engaged configuration and a disengaged configuration; wherein the lock securing device prevents activation of the locking mechanism when the lock securing device is in the engaged configuration,
wherein the locking mechanism comprises a locking element and a biasing element, and the hook arm comprises a recess configured to receive the locking element of the locking mechanism, such that when the hook arm is in the closed configuration, the locking element of the locking mechanism is urged by the biasing element into the recess of the hook arm, thereby locking the hook arm and hook in the closed configuration,
wherein the hook body comprises a cavity, the locking mechanism is located within the cavity of the hook body, the sides of the hook body that define the cavity comprise at least one groove, the lock securing device comprising at least one lock formation adapted to be received into the at least one groove, such that during use the at least one lock formation is received within the at least one groove when the lock securing device is in the engaged configuration, and the at least one lock formation is not received within the at least one groove when the lock securing device is in the disengaged configuration.

2. The hook according to claim 1, wherein the lock securing device comprises at least two lock formations adapted to be received into at least two grooves in the sides of the hook body defining the cavity.

3. The hook according to claim 1, wherein the lock securing device comprises a rotatable locking element, and the rotatable locking element comprises the or each lock formation.

4. The hook according to claim 3, wherein the rotatable locking element comprises at least two lock formations and is shaped symmetrically about an axis of rotation of the rotatable locking element.

5. The hook according to claim 1, wherein the lock securing device comprises a biasing element configured to urge the at least one lock formation into the at least one groove when the locking mechanism is in the closed configuration.

6. The hook according to claim 5, wherein the biasing element of the lock securing device is a torsion spring or a leaf spring.

7. The hook according to claim 1, wherein the lock securing device comprises one or more actuators.

8. The hook according to claim 7, wherein the hook body comprises a handle, and wherein the actuator of the lock securing device is adapted to be operated by the thumb of a user whilst the user is gripping the handle of the hook body with the same hand.

9. The hook according to claim 1, wherein the lock securing device comprises a retaining formation configured to retain the lock securing device in the engaged configuration when the lock securing device is in the engaged configuration and/or to retain the lock securing device in the disengaged configuration.

10. The hook according to claim 9, wherein the locking mechanism comprises a first retaining groove configured to receive the retaining formation of the lock securing device when the lock securing device is in the engaged formation.

11. The hook according to claim 9, wherein the locking mechanism comprises a second retaining groove configured to receive the retaining formation of the lock securing device when the lock securing device is in the disengaged formation.

12. The hook according to claim 11, wherein the locking element comprises a pin, and the lock securing device is configured to be rotated about the pin of the locking mechanism between the engaged configuration and disengaged configuration.

13. The hook according to claim 1, wherein the locking mechanism comprises the lock securing device.

14. A hook comprising a hook body, a hook arm, a locking mechanism, and a lock securing device; the hook arm being pivotably coupled to the hook body such that the hook arm and hook body are pivotable relative to one another between an open configuration in which the hook arm and the hook body together define a discontinuous boundary, and a closed configuration in which the hook arm and the hook body define a substantially continuous boundary; the locking mechanism being configured to lock the hook arm in at least the closed configuration; the lock securing device being configured to move between an engaged configuration and a disengaged configuration;

wherein the lock securing device prevents activation of the locking mechanism when the lock securing device is in the engaged configuration, wherein the hook body comprises a cavity, and the locking mechanism is located within the cavity of the hook body, and wherein the lock securing device comprises a securing element and a biasing element and the cavity is configured to receive the securing element of the lock securing device, such that when the lock mechanism is in the closed configuration, the securing element of the lock securing device is urged by the biasing element into the locked closed position, thereby securing the lock mechanism in the closed configuration.

\* \* \* \* \*